United States Patent
Sharpe et al.

(10) Patent No.: US 11,212,100 B2
(45) Date of Patent: Dec. 28, 2021

(54) SYSTEMS AND METHODS OF PROVIDING AND ELECTRONICALLY VALIDATING TICKETS AND TOKENS

(71) Applicant: moovel North America, LLC, Portland, OR (US)

(72) Inventors: David Sharpe, Vancouver, WA (US); William Derocher, Portland, OR (US); Zachary Babb, Portland, OR (US); Brian Young, Portland, OR (US); Tim Roberts, Tigard, OR (US); Sopia Maletz, Portland, OR (US); Matthew Rotter, Portland, OR (US); Mitch Drew, Portland, OR (US)

(73) Assignee: moovel North America, LLC, Portland, OR (US)

( * ) Notice: Subject to any disclaimer, the term of this patent is extended or adjusted under 35 U.S.C. 154(b) by 58 days.

(21) Appl. No.: 15/934,902

(22) Filed: Mar. 23, 2018

(65) Prior Publication Data

US 2019/0058591 A1 Feb. 21, 2019

Related U.S. Application Data

(63) Continuation-in-part of application No. 15/803,695, filed on Nov. 3, 2017.
(Continued)

(51) Int. Cl.
*H04L 9/32* (2006.01)
*G06Q 50/30* (2012.01)
(Continued)

(52) U.S. Cl.
CPC .......... *H04L 9/3213* (2013.01); *G06Q 10/02* (2013.01); *G06Q 20/045* (2013.01);
(Continued)

(58) Field of Classification Search
CPC ... H04L 9/3213; H04L 9/3247; H04L 9/3234; H04L 2209/56; G06Q 20/045;
(Continued)

(56) References Cited

U.S. PATENT DOCUMENTS 5,866,890 A * 2/1999 Neuner .................. G07C 11/00
235/381
9,792,604 B2 * 10/2017 Gray .................. G06Q 20/0457
(Continued)

*Primary Examiner* — Matthew Smithers
*Assistant Examiner* — Mirza Israr Javed
(74) *Attorney, Agent, or Firm* — Jones Day

(57) ABSTRACT

Systems and methods for facilitating use of physical tokens in a transit system are disclosed. In one implementation, a method for facilitating use of physical tokens by a server includes generating a token identifier and generating, using a private key associated with the server, a cryptographic signature based on the token identifier. The method further includes transmitting the token identifier and the cryptographic signature to a token dispenser. The token dispenser is configured to dispense a physical token, and the physical token is configured to provide the token identifier and the cryptographic signature to a token validator. The method also includes receiving, from the token dispenser, (i) a first indication that the physical token is dispensed, (ii) selection of a fare type, and (iii) dispenser context data including a dispense location, associating the token identifier with the selected fare type and the dispenser context data, and receiving, from the token validator, a second indication that the physical token is being validated. The second indication (i) is transmitted after the token validator verifies the cryptographic signature using a public key associated with the server, and (ii) includes the token identifier provided by the physical token and validator context data including a validation location. Furthermore, the method includes identifying the fare type associated with the token identifier, accessing, based on the fare type, a set of restrictions governing use
(Continued)

of the physical token, and determining whether the physical token is valid based on (i) the accessed set of restrictions, (ii) the validator context data associated with the token identifier provided by the physical token, and (iii) the dispenser context data received from the token validator. Moreover, the method includes transmitting a communication to the ticket validator indicating whether the physical token is valid, wherein the ticket validator, in response to receiving the communication, outputs an indicator whether the physical token is valid.

23 Claims, 15 Drawing Sheets

Related U.S. Application Data

(60) Provisional application No. 62/475,828, filed on Mar. 23, 2017, provisional application No. 62/505,972, filed on May 14, 2017, provisional application No. 62/619,099, filed on Jan. 18, 2018.

(51) Int. Cl.
*G06Q 20/10* (2012.01)
*G06Q 20/14* (2012.01)
*G06Q 20/04* (2012.01)
*G06Q 10/02* (2012.01)
*H04W 4/02* (2018.01)

(52) U.S. Cl.
CPC ......... *G06Q 20/102* (2013.01); *G06Q 20/145* (2013.01); *G06Q 50/30* (2013.01); *H04L 9/3234* (2013.01); *H04L 9/3247* (2013.01); *H04L 2209/56* (2013.01); *H04W 4/02* (2013.01)

(58) Field of Classification Search
CPC .... G06Q 20/145; G06Q 10/02; G06Q 20/102; G06Q 50/30; G06Q 20/085; G06Q 20/127; G06Q 20/3823; G06Q 20/38215; G06Q 20/3224; G06Q 20/0457; G06Q 20/385; G06Q 20/3829; H04W 4/02; H04W 12/0431; H04W 12/08; H04W 12/77
See application file for complete search history.

(56) References Cited

U.S. PATENT DOCUMENTS

| | | | |
|---|---|---|---|
| 9,881,260 B2* | 1/2018 | Parker | G07B 15/00 |
| 2003/0135458 A1* | 7/2003 | Tadano | G06Q 30/04 |
| | | | 705/40 |
| 2004/0002904 A1* | 1/2004 | Deas | G06Q 30/0633 |
| | | | 705/26.62 |
| 2005/0005114 A1* | 1/2005 | Medvinsky | G06F 21/10 |
| | | | 713/168 |
| 2005/0283444 A1* | 12/2005 | Ekberg | G07F 7/0886 |
| | | | 705/67 |
| 2012/0207305 A1* | 8/2012 | Gallo | H04W 4/80 |
| | | | 380/271 |
| 2014/0201066 A1* | 7/2014 | Roux | G06Q 20/3227 |
| | | | 705/39 |
| 2015/0134552 A1* | 5/2015 | Engels | H04L 9/3297 |
| | | | 705/318 |
| 2015/0371228 A1* | 12/2015 | Kershaw | G06Q 20/3274 |
| | | | 705/77 |
| 2016/0092796 A1* | 3/2016 | Tran | G06Q 10/02 |
| | | | 705/5 |
| 2016/0112202 A1* | 4/2016 | Vandervort | H04L 9/3234 |
| | | | 713/176 |
| 2017/0293908 A1* | 10/2017 | Wadley | G07C 9/00896 |
| 2018/0278422 A1* | 9/2018 | Young | H04L 9/3247 |
| 2019/0058591 A1* | 2/2019 | Sharpe | H04L 9/3234 |

* cited by examiner

SYSTEMS AND METHODS OF PROVIDING AND ELECTRONICALLY VALIDATING TICKETS AND TOKENS

CROSS-REFERENCE TO RELATED APPLICATION(S)

The present application is a continuation-in-part of U.S. application Ser. No. 15/803,695, filed Nov. 3, 2017, titled "SYSTEMS AND METHODS OF PROVIDING AND VALIDATING DIGITAL TICKETS." The present application also claims priority to U.S. Provisional Application No. 62/475,828, filed Mar. 23, 2017, titled "MOBILE TICKETING SOLUTIONS," U.S. Provisional Application No. 62/505,972, filed May 14, 2017 titled "CHECK-IN-CHECK-OUT, CHECK-IN-BE-OUT, AND TRANSIT ACCOUNT/STORED VALUE SERVICE, and U.S. Provisional Application No. 62/619,099, filed Jan. 18, 2018 titled "SYSTEMS AND METHOD FOR AUTOMATICALLY DETECTING BOARDING AND DEBOARDING OF PASSENGER. The disclosures of the above applications are incorporated by reference herein for all purposes.

TECHNICAL FIELD

The present disclosure relates to systems and methods for facilitating use of physical tokens in a transit system. In particular, the present disclosure relates to systems and methods for validating physical tokens to prevent fraudulent or improper use.

BACKGROUND

Historically, consumers show that they previously purchased a fare or a pass for transit or a right for admission to a show, performance, or an event by presenting a physical representation of that purchase, commonly referred to as a ticket. Over time, physical tickets have evolved to contain additional security features, such as holograms, QR codes, security codes, etc. Such tickets typically require an electronic validation procedure. For example, when a ticket containing an electronic security feature such as a QR code is presented, the QR code in the ticket may be read by a QR reader and validated based on the information included in the QR code.

However, conventional security features may be defeated and conventional tickets are still vulnerable to a wide range of fraud techniques. For example, a person may save the ticket with a QR code (e.g., by taking a photo of the QR code) and may reuse the ticket by presenting the reproduced ticket.

SUMMARY

In one implementation, a method for facilitating use of physical tokens by a server includes generating a token identifier and generating, using a private key associated with the server, a cryptographic signature based on the token identifier. The method further includes transmitting the token identifier and the cryptographic signature to a token dispenser. The token dispenser is configured to dispense a physical token, and the physical token is configured to provide the token identifier and the cryptographic signature to a token validator. The method also includes receiving, from the token dispenser, (i) a first indication that the physical token is dispensed, (ii) selection of a fare type, and (iii) dispenser context data including a dispense location, associating the token identifier with the selected fare type and the dispenser context data, and receiving, from the token validator, a second indication that the physical token is being validated. The second indication (i) is transmitted after the token validator verifies the cryptographic signature using a public key associated with the server, and (ii) includes the token identifier provided by the physical token and validator context data including a validation location. Furthermore, the method includes identifying the fare type associated with the token identifier, accessing, based on the fare type, a set of restrictions governing use of the physical token, and determining whether the physical token is valid based on (i) the accessed set of restrictions, (ii) the validator context data associated with the token identifier provided by the physical token, and (iii) the dispenser context data received from the token validator. Moreover, the method includes transmitting a communication to the ticket validator indicating whether the physical token is valid, wherein the ticket validator, in response to receiving the communication, outputs an indicator whether the physical token is valid.

Another implementation utilizes a non-transitory computer-readable storage medium storing instructions that when executed by a computer cause the computer to perform a method for facilitating use of physical tokens. The method includes generating a token identifier and generating, using a private key associated with the server, a cryptographic signature based on the token identifier. The method further includes transmitting the token identifier and the cryptographic signature to a token dispenser. The token dispenser is configured to dispense a physical token, and the physical token is configured to provide the token identifier and the cryptographic signature to a token validator. The method also includes receiving, from the token dispenser, (i) a first indication that the physical token is dispensed, (ii) selection of a fare type, and (iii) dispenser context data including a dispense location, associating the token identifier with the selected fare type and the dispenser context data, and receiving, from the token validator, a second indication that the physical token is being validated. The second indication (i) is transmitted after the token validator verifies the cryptographic signature using a public key associated with the server, and (ii) includes the token identifier provided by the physical token and validator context data including a validation location. Furthermore, the method includes identifying the fare type associated with the token identifier, accessing, based on the fare type, a set of restrictions governing use of the physical token, and determining whether the physical token is valid based on (i) the accessed set of restrictions, (ii) the validator context data associated with the token identifier provided by the physical token, and (iii) the dispenser context data received from the token validator. Moreover, the method includes transmitting a communication to the ticket validator indicating whether the physical token is valid, wherein the ticket validator, in response to receiving the communication, outputs an indicator whether the physical token is valid.

In yet another embodiment, a server for facilitating use of physical tokens in a transit system includes one or more processors configured to generate a token identifier and generate, using a private key associated with the server, a cryptographic signature based on the token identifier. The processors are further configured to transmit the token identifier and the cryptographic signature to a token dispenser. The token dispenser is configured to dispense a physical token, and the physical token is configured to provide the token identifier and the cryptographic signature to a token validator. The processors are also configured to receive, from the token dispenser, (i) a first indication that the physical token is dispensed, (ii) selection of a fare type, and (iii) dispenser context data including a dispense location, associate the token identifier with the selected fare type and the dispenser context data, and receive, from the token validator, a second indication that the physical token is being validated. The second indication (i) is transmitted after the token validator verifies the cryptographic signature using a public key associated with the server, and (ii) includes the token identifier provided by the physical token and validator context data including a validation location. Furthermore, the processors are configured to identify the fare type associated with the token identifier, access, based on the fare type, a set of restrictions governing use of the physical token, and determine whether the physical token is valid based on (i) the accessed set of restrictions, (ii) the validator context data associated with the token identifier provided by the physical token, and (iii) the dispenser context data received from the token validator. Moreover, the processors are configured transmit a communication to the ticket validator indicating whether the physical token is valid, wherein the ticket validator, in response to receiving the communication, outputs an indicator whether the physical token is valid.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as interconnected machine modules within the computing system and/or (2) as a sequence of computer implemented steps running on a computing system. The implementation is a matter of choice dependent on the performance requirements of the computing system implementing the invention. Accordingly, the logical operations making up the embodiments described herein are referred to alternatively as operations, steps or modules.

Aspects of the disclosure pertains to computer systems and methods for providing and validating a digital ticket and/or a token. More particularly, the present disclosure relates to computer systems and methods for providing and validating a digital ticket and/or a token that are capable of detecting and rejecting fraudulent digital tickets and/or tokens. For example, the disclosed systems and methods may detect and reject digital tickets or tokens that have been copied (e.g., screenshot or photographed) and/or previously used.

Example Operating Environments

Figure 1:
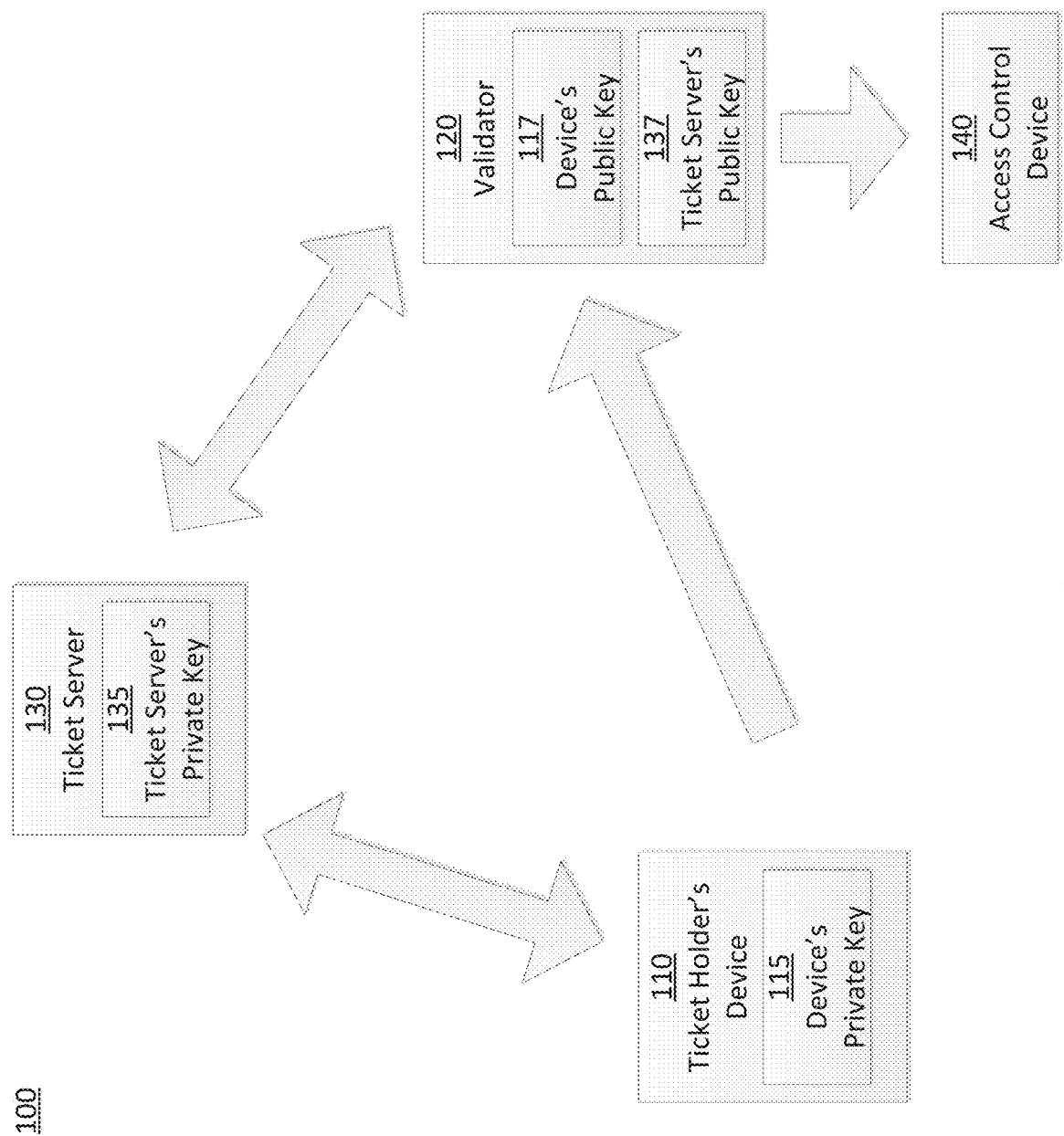
FIG. 1 illustrates an example digital ticketing system in accordance with the disclosed embodiments.

FIG. 1 illustrates an example digital ticketing system 100 in which concepts consistent with the principles of the invention may be implemented. As shown in FIG. 1, system 100 includes a ticket holder's device 110, a validator 120, a ticket server 130, and an access control device 140.

Ticket holder's device 110 may be any device capable of providing data directly and/or indirectly to validator 120. The data may include, for example, a digital ticket previously purchased by the ticket holder. In some embodiments, ticket holder's device 110 may be a portable device, such as a cellular phone, PDA, tablet, laptop, smart watch. Alternatively, or additionally, ticket holder's device 110 may be a dedicated device (e.g., a fob) for providing the data. In some embodiments, ticket holder's device 110 may be a general-purpose electronic device (e.g., tablet, cellular phone, laptop) executing one or more pieces of software (e.g., an app) implementing the functions of ticket holder's device 110.

In some embodiments, ticket holder's device 110 may provide the data (e.g., a digital ticket) by transmitting the data using a transmitter. For example, ticket holder's device 110 may transmit the data using a transmitter that may be included in, or accessible to, ticket holder's device 110 to a receiver that may be included in, and/or accessible to, validator 120. The transmitter of ticket holder's device 110 and the receiver of validator 120 may be based on, for example, Wi-Fi, Bluetooth, near-field communication (NFC), infrared, and/or audio-based contactless communication technologies.

Additionally, or alternatively, ticket holder's device 110 may provide the data to validator 120 by making the data available for retrieval by validator 120 or by another device/component connected to validator 120. For example, ticket holder's device 110 may provide data by causing display of a visual content encoded with the data (e.g., barcode, QR code, or AZTEC) on a display of ticket holder's device 110. Subsequently, a camera included in, or accessible to, validator 120 may capture and decode the visual content to obtain the data. In another example, ticket holder's device 110 may store the data on a data store accessible by validator 120, and subsequently, validator 120 may retrieve the stored data from the data store.

As used herein, a "digital ticket" may be a set of data that identifies and/or defines one or more products and/or services that may have been purchased (or authorized to use) by the ticket holder. For example, a digital ticket may include identifiers of one or more products and/or services, usable time periods, blackout periods, an expiration time/date, and/or a valid duration. The products and/or services may have been purchased, for example, by the ticket holder via an app on ticket holder's device 110, an e-commerce website, a dedicated kiosk, and/or a salesperson at a ticket counter. After the purchase, ticket holder's device 110 may have obtained the digital ticket associated with the purchased products and/or services from ticket server 130.

In some embodiments, digital tickets may be associated with transit accounts. In these embodiments, a digital ticket purchased by a ticket holder may be available to use on a plurality of devices that are associated with the ticket holder. For example, a digital ticket purchased from a home computer of a ticket holder may also be available to use on a smartphone of the same ticket holder.

In embodiments where digital tickets are associated with transit accounts, some of the digital tickets may be associated with a placeholder account that are not associated with any ticket holder. For example, limited-use digital tickets or single-use tickets may be associated with a placeholder account. Such tickets may be purchased from a kiosk or a ticket dispenser at a transit station.

Ticket server 130 may be any physical or virtual server capable of providing the digital ticket associated with the purchased products and/or services to ticket holder's device 110. In some embodiments, ticket server 130 may be a group of physical and/or virtual servers. In some embodiments, at least some functions of ticket server 130 may be implemented on a cloud platform such as Amazon Web Services, Microsoft Azure, or Google Cloud.

In some embodiments, ticket server 130 may maintain records (e.g., identifiers) of digital tickets that have been used, unused, and/or voided. In some embodiments, ticket server 130 may maintain records (e.g., identifiers) of ticket holder's devices, pieces of software executing on ticket holder's devices, and validators that may have been compromised. In some embodiments, ticket server 130 may be further capable of providing such records, or data derived from such records, to validator 120 and/or ticket holder's device 110.

Validator 120 may be any device capable of obtaining and validating the digital ticket provided by ticket holder's device 110. Validator 120 may use the information provided by ticket holder's device 110 (e.g., the digital ticket), information available locally to validator 120 (e.g., records of digital tickets validator 120 has validated), and/or information provided by ticket server 130 (e.g., records of digital tickets that have been used, unused, and/or voided in system 100) to determine whether the digital ticket is valid or not. Based on the validation result, validator 120 may cause access control device 140 to generate an output, which may include, for example, displaying that the digital ticket is valid/invalid and/or unlocking an electronically controlled gate.

In some embodiments, validator 120 may be an immobile device and/or mounted to a fixed structure. For example, validator 120 may be attached to an electronically controlled gate in a transit station. In another example, validator may be mounted on a fixed structure (e.g., a pole) inside a vehicle. Alternatively, validator 120 may be a portable device. For example, validator 120 may be a portable device carried and operated by an operator. In some embodiments, validator 120 may be placed at a location where ticket holders must pass through to use the purchased products and/or services (e.g., at an entrance/exit of a transit station), and access control device 140 may control the ticket holder's access to such a location based on the digital ticket validation results.

Access control device 140 may be any device that can generate an output indicative of whether a person is permitted or denied from proceeding beyond the location of access control device 140. In some embodiments, validator 120 may be implemented on an embedded controller inside access control device 140.

Alternatively, validator 120 may be external to access control device 140. Validator 120 may control access control device 140 using a wired connection or wirelessly. In some embodiments, validator 120 may control a plurality of access control devices.

In some embodiments, access control device 140 may be a gate or a door, which may be electronically controlled such that the gate/door is locked when a person is denied from proceeding and unlocked/turned when the person is permitted to proceed. Additionally, or alternatively, access control device 140 may include a speaker that produces sound, and the produced sound may be indicative of whether a person is permitted or denied from proceeding. In some embodiments, access control device 140 may include a display monitor that displays a visual content indicative of whether a person is permitted or denied from proceeding. In some embodiments, access control device 140 may include one or more light emitting devices, and access control device 140 may turn on or off one or more of the light emitting devices to indicate whether the rider is permitted or denied form proceeding.

As shown in FIG. 1, ticket holder's device 110 may communicate with ticket server 130 (e.g., to obtain digital tickets). In some embodiments, ticket holder's device 110 and ticket server 130 may communicate with each other via the Internet. Alternatively, or additionally, ticket holder's device 110 and ticket server 130 may communicate with each other via a private network. Ticket holder's device 110 may connect to the internet and/or the private network via a communication module that may be included in, or accessible to, ticket holder's device 110. The communication module may be based on Bluetooth, Wi-Fi, 3G, and/or 4G LTE, to provide some examples. For example, ticket holder's device 110 may communicate with ticket server 130 using secure HTTPS connections.

Further as shown in FIG. 1, validator 120 may communicate with ticket server 130. For example, validator 120 may provide ticket server 130 with records (e.g., identifiers) of digital tickets that have been validated by validator 120.

In some embodiments, validator 120 and ticket server 130 may communicate with each other via the Internet. Alternatively, or additionally, validator 120 and ticket server 130 may communicate with each other via a private network. Validator 120 may connect to the internet and/or the private network via a communication module that may be included in, or accessible to, validator 120. The communication module may be based on Bluetooth, Wi-Fi, 3G, and/or 4G LTE communication technologies, to provide some examples. In some embodiments, the communication between validator 120 and ticket server 130 may be encrypted. For example, validator 120 may communicate with ticket server 130 using secure HTTPS connections.

In some situations, validator 120's ability to communicate with ticket server 130 may be interrupted. For example, validator 120 may be inside a vehicle passing through an underground tunnel. Thus, in some embodiments, when validator 120's ability to communicate with ticket server 130 is interrupted, validator 120 may store the data that needs to be transmitted to ticket server 130 in a local data store. When validator 120's ability to communicate with ticket server 130 is restored, the data in the local data store may be transmitted to ticket server 130. As an example, after validator 120's ability to communicate with ticket server 130 is interrupted, validator 120 may begin storing records of digital tickets that have been validated by validator 120. After validator 120's ability to communicate with ticket server 130 is restored, validator 120 may provide the stored records to ticket server 130 in batch.

Ticket holder's device 110, validator 120, and ticket server 130 may have access to various public and/or private digital keys. As shown in FIG. 1, for example, ticket server 130 may have access to a private key associated with ticket server 130 ("ticket server's private key 135"). In some embodiments, ticket server's private key 135 may be stored on ticket server 130. Alternatively, or additionally, ticket server's private key 135 may be stored on a data store accessible by ticket server 130. In some embodiments, ticket server's private key 135 may be stored on a hardware security module (HSM), embedded secure element (eSE), secure access module (SAM), and/or trusted execution environment (TEE).

Further as shown in FIG. 1, validator 120 may have access to a public key corresponding to ticket server 130's public key ("ticket server's public key 137"). In some embodiments, ticket server's public key 137 may be stored on validator 120. Alternatively, or additionally, ticket server's public key 137 may be stored on a data store accessible by validator 120. In some embodiments, ticket server's public key 137 may be stored on a HSM, SE, and/or TEE.

Moreover, ticket holder's device 110 may have access to a private key associated with ticket holder's device 110 ("device's private key 115"). In some embodiments, device's private key 115 may be stored on ticket holder's device 110. Alternatively, or additionally, device's private key 115 may be stored on a data store accessible by ticket server 130. In some embodiments, device's private key 115 may be stored on a HSM, SE, and/or TEE.

In some embodiments, device's private key 115 may be a derived key (or a composed key) that is derived based on secret data known to both the ticket holder's device 110 and the validator 120.

As shown in FIG. 1, validator 120 may further have access to a public key corresponding to device's public key 117. In some embodiments, device's public key 117 may be stored on validator 120. Alternatively, or additionally, device's public key 117 may be stored on a data store accessible by validator 120. In some embodiments, device's public key 117 may be stored on a HSM, SE, and/or TEE.

Private key 115 and public key 117 may be associated to one ticket holder's device 110. Alternatively, private key 115 and public key 117 may be associated with a plurality of ticket holders' devices. That is, private key 115 may be shared among the plurality of ticket holders' devices.

While public/private key pairs have many different uses, in system 100, a private key may be used to generate a digital signature based on given data (i.e., to "sign the data"), and a corresponding public key (i.e., a public key that was generated with the private key using a public-key cryptography algorithm) may be used to verify that the generated digital signature is indeed generated by an entity that has access to the corresponding private key. Additionally, the corresponding public key may be used to further verify that the signed data has not been altered since the digital signature was generated.

A digital signature may be generated in numerous ways. In one example, a digital signature may be generated by encrypting a hash value of given data using a private key. In this example, a corresponding public key may be used to decrypt the digital signature and obtain the hash value of the original data. Thus, if the decrypted digital signature matches the hash value of the received data, it may prove that (i) the data was signed with a private key that corresponds to the public key, and (ii) the data has not changed since it was signed. However, if the decrypted digital signature does not match the hash value of the received data, the data has been altered and/or the digital signature was created with a private key that does not correspond to the public key.

In another example, a digital signature may also be generated by encrypting a portion or all of the given data using a private key. Here, a corresponding public key may be used to decrypt the digital signature to obtain the portion of, the data or the entire data. Subsequently, the decrypted digital signature may be compared to the received data to determine (i) that the data was signed with a private key that corresponds to the public key, and (ii) that the data has not changed since it was signed. It may be advantageous in terms of performance, however, to generate a digital signature based on a hash value rather than a portion or all of the given data because the size of a hash value is typically smaller than the size of the data.

Figure 2:
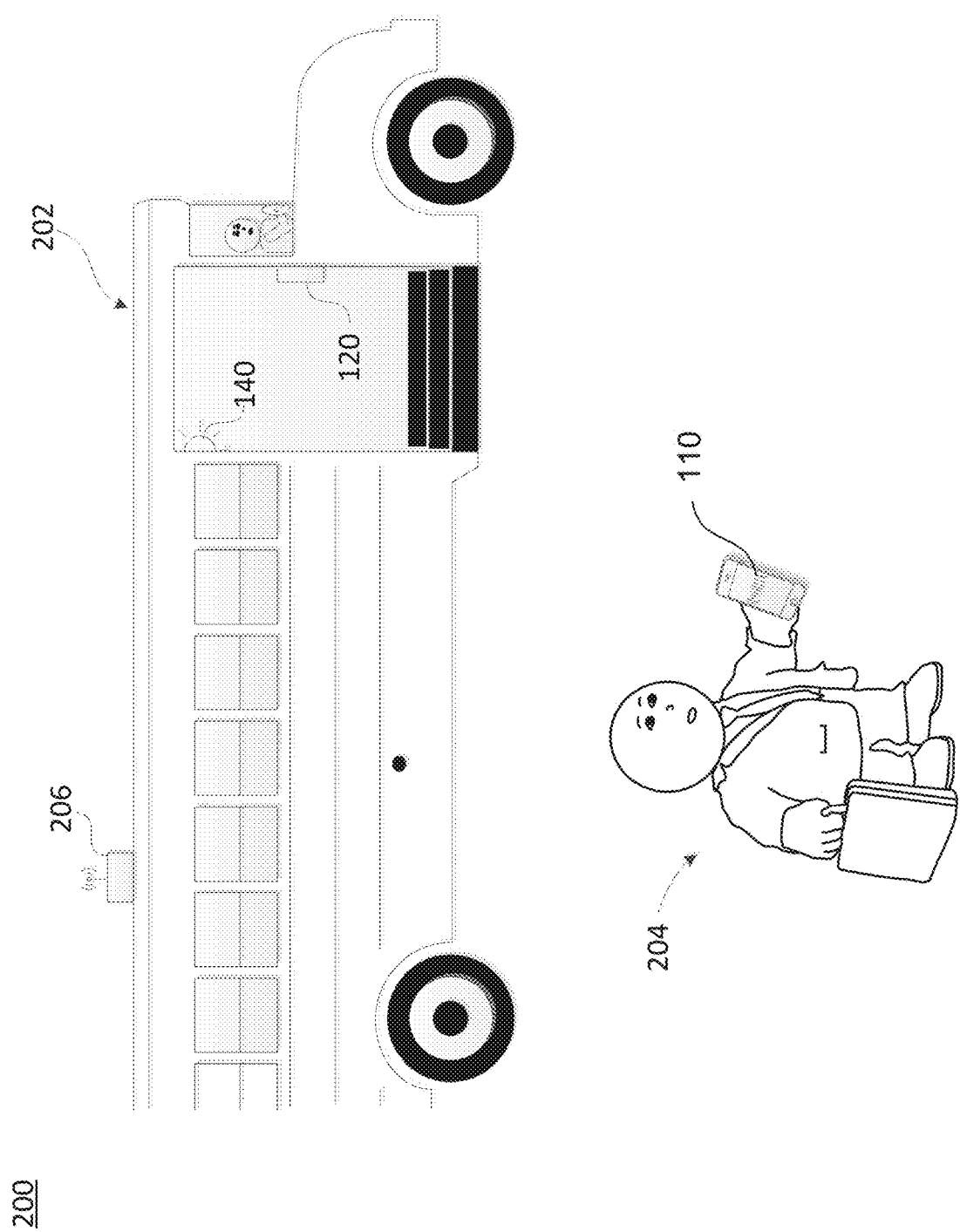
FIG. 2 illustrates an example digital ticketing system deployed on a vehicle in accordance with the disclosed embodiments.

FIG. 2 illustrates an example digital ticketing system 200 in which concepts consistent with the principles of the invention may be implemented. System 200 is similar to system 100 of FIG. 1 except that validator 120 is deployed on a vehicle 202.

As shown in FIG. 2, validator 120 may be located near vehicle 202's door so that ticket holder 204 is able to use ticket holder's device 110 to provide a digital ticket to validator 120 as he/she boards vehicle 202. Alternatively, or additionally, validator 120 may be operated by a human operator (e.g., bus driver). In some embodiments, validator 120 may be mounted on a 1.25-inch stanchion and connected to the bus power and router 204 using a wiring harness.

As discussed above, validator 120 may communicate with ticket server 130. In the example system of FIG. 2, validator 120 may communicate with ticket server 130 (not shown in FIG. 2) using a router 206 installed on vehicle 202. For example, router 206 may implement cellular communication technology that can connect validator 120 to the Internet and/or a private network that includes ticket server 130 using cellular communication networks. Router 206 may communicate with validator 120 using a wired connection (e.g., Ethernet) or a wireless connection (e.g., Wi-Fi). In some embodiments, router 206 may further provide ticket holder's device 110 with an access to the Internet and/or ticket server 130.

Moreover, in system 200, access control device 140 may include one or more light indicators, which changes color based whether validator 120 has determined the digital ticket to be valid or not. For example, a green light may turn on after validator 120 has determined the digital ticket to be valid, and a red light may turn on after validator 120 has determined the digital ticket to be invalid. If a ticket holder attempts to board vehicle 202 when a red light is turned on, an operator (e.g., bus drive) of vehicle 202 may intervene to prevent the ticket holder 204 from boarding.

In FIG. 2, an operator may verify that validator 120 is functioning properly by providing a maintenance instruction to validator 120. The maintenance instruction may be provided to validator 120 in the same manner as digital tickets. For example, an operator may display (e.g., on an operator's device) a QR code associated with one or more maintenance processes, which may be captured by validator 120. After decoding the captured QR code, validator 120 may perform the maintenance processes associated with the QR code. For example, validator 120 may perform a full system check.

Furthermore, an operator may configure validator 120 by providing a configuration instruction to validator 120. The configuration instruction may be provided to validator 120 in the same manner as digital tickets. For example, an operator may display (e.g., on an operator's device) a QR code associated with a bus route, which may be captured by validator 120. After decoding the captured QR code, validator 120 may configure itself for the bus route associated with the scanned QR code.

In some embodiments, validator 120 may be configured remotely. For example, validator 120 may communicate with a remote device management system, which may provide configuration instruction to validator 120 when requested by validator 120 and/or when an updated configuration instruction is available at the remote device management system. In some embodiments, the remote device management system may generate configuration instructions based on computer-aided dispatch (CAD) system.

FIG. 2 illustrates an example digital ticketing system 300 in which concepts consistent with the principles of the invention may be implemented. System 300 is similar to system 100 of FIG. 1 except that validator 120 is deployed on a transit station.

Figure 3:
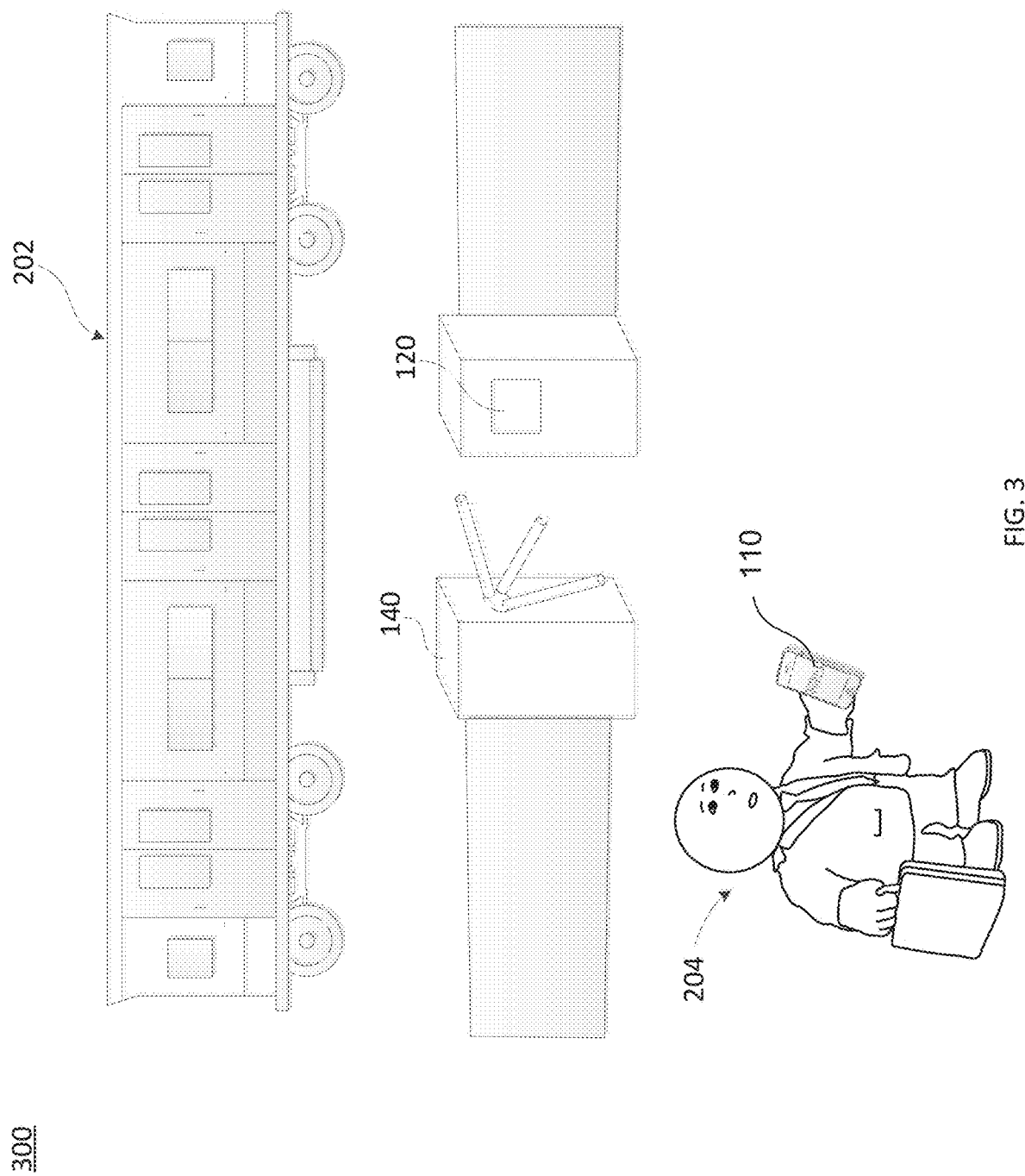
FIG. 3 illustrates an example digital ticketing system deployed in a transit station in accordance with the disclosed embodiments.

As shown in FIG. 3, validator 120 may be located near at an entrance of the transit station so that ticket holder 204 may use ticket holder's device 110 to provide a digital ticket to validator 120 as ticket holder 204 enters the transit station. Alternatively, or additionally, validator 120 may be operated by a human operator stationed near the entrance. In the example system of FIG. 3, access control device 140 may be an access gate or a swivel gate that is unlocked after validator 120 has determined the digital ticket to be valid.

An Example Validation Process

Figure 4:
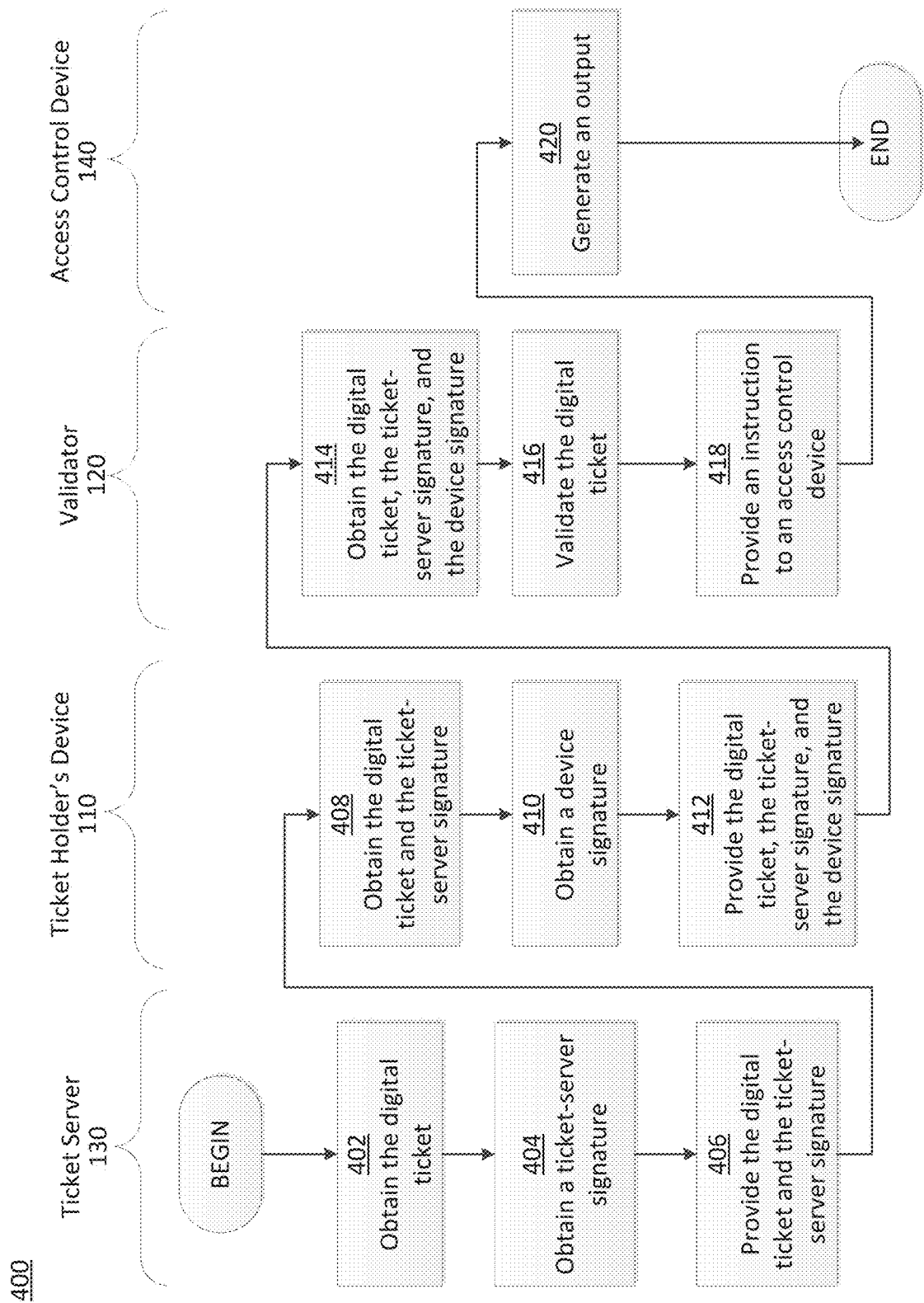
FIG. 4 illustrates a process for validating a digital ticket in accordance with the disclosed embodiments.

FIG. 4 illustrates an example of a process 400 implemented by digital ticketing system 100 for providing and validating a digital ticket in accordance with the disclosed embodiments. Digital ticketing system 100 implementing process 400 may be capable of detecting fraudulently obtained and/or used digital tickets. As shown in the example of FIG. 4, steps 402-406 may be implemented by ticket server 130, steps 408-412 by ticket holder's device 110, steps 414-418 by validator 120, and step 420 by access control device 140.

At a step 402, ticket server 130 may obtain a digital ticket. In some embodiments, ticket server 130 may generate the digital ticket. Alternatively, ticket server 130 may cause generation of the digital ticket and obtain the generated digital ticket. For example, ticket server 130 may request a ticket generation server to generate a digital ticket and retrieve/receive the generated ticket from the ticket generation server.

In some embodiments, ticket server 130 may obtain the digital ticket in response to receiving an indication that a purchase process for one or more products or services has been completed, for example, by a ticket holder. As discussed above, a ticket holder may complete a purchase process using an app or a web browser executing on ticket holder's device 110 or via a kiosk. Alternatively, a ticket holder may complete an offline purchase process through a salesperson. The purchase process may include obtaining a selection(s) of product(s)/service(s), payment information, and/or personal information of the ticket holder.

As discussed above, a digital ticket may be a set of data that identifies and/or defines one or more purchased products and/or services. For example, a digital ticket may include identifiers of purchased products and/or services. In another example, a digital ticket may further include usable time periods, blackout periods, an expiration time/date, and/or a valid duration. Some of the data that may be included the digital ticket, such as an expiration time/date and a valid duration, may be determined based on the products and/or services purchased and/or based on one or more business rules. For example, a discounted product/service may have a shorter valid duration, while a full-priced product/service may have a relatively longer valid duration. Additionally, or alternatively, some of the data that may be included the digital ticket, such as identifiers of purchased products and/or services, may be determined based on the information collected during the purchase process. In an example where the digital ticketing system is deployed on a transit system (e.g., system 300 of FIG. 3), the identifiers of purchased products and/or services may include identifiers of a transit route, fare type 622, and/or rider type (e.g., regular, disabled, senior, college, etc.).

At a step 404, ticket server 130 may obtain a ticket-server signature generated at least based on the obtained digital ticket. In some embodiments, ticket server 130 may generate the ticket-server signature. Alternatively, ticket server 130 may cause the ticket-server signature to be generated and obtain the generated ticket-server signature. For example, ticket server 130 may instruct a signature generator to generate the ticket-server signature and obtain the ticket-server signature generated by the signature generator.

The ticket-server signature may be generated using ticket server's private key 135. For example, the ticket-server signature may be generated by encrypting a hash value of the digital ticket with ticket server's private key 135. In another example, the ticket-server signature may be generated by encrypting at least a portion of the digital ticket with ticket server's private key 135.

As discussed above in reference to FIG. 1, in embodiments where the ticket-server signature is generated by ticket server 130, ticket server's private key 135 may be stored on ticket server 130 or a data store accessible to ticket server 130. In embodiments where the ticket-server signature is generated by an entity other than ticket server 130 (e.g., a signature generator), ticket server's private key 135 may be stored on a data store in, or accessible by, the entity. In some embodiments, a limited number of entities (e.g., ticket server 130 and/or ticket server 130's signature generator) may have access to ticket server's private key 135.

Accordingly, any entity that has access to the digital ticket, the ticket-server signature, and ticket server's public key 137 (e.g., validator 120) may determine: (i) whether the digital ticket has been indeed signed by ticket server 130, and (ii) whether the digital ticket has not been altered since it was signed by ticket server 130. Thus, such an entity may detect digital tickets that have been generated and/or altered by an unauthorized entity.

In some embodiments, the ticket-server signature may be generated further based on time-dependent data such as a timestamp representing the time and/or date at which the ticket-server signature is obtained/generated. In these embodiments, two ticket-server signatures obtained/generated based on the same digital ticket at two different times may be different.

In some embodiments, after generating the ticket-server signature based on a digital ticket, ticket server 130 may generate a new ticket-server signature based on the same digital ticket. For example, ticket server 130 may generate a new ticket-server signature after a predetermined time from when the last ticket-server signature was generated based on the same digital ticket. In another example, ticket server 130 may generate a new ticket-server signature upon request by ticket holder's device 110. In embodiments where the ticket-server signature is generated further based on time-dependent data, the new ticket-server signature may be different from the previous ticket-server signature.

At a step 406, ticket server 130 may provide the digital ticket and the ticket-server signature. For example, ticket server 130 may provide the digital ticket and the ticket-server signature to ticket holder's device 110. In some embodiments, as discussed above in reference to FIG. 1, ticket server 130 may transmit the digital ticket and the ticket-server signature, for example, to ticket holder's device 110. Alternatively, or additionally, ticket server 130 may make the digital ticket and the ticket server signature available for retrieval, for example, by ticket holder's device 110. In embodiments where a new ticket-server signature is generated after step 404, the new ticket-server signature and/or the digital ticket may be provided (e.g., to ticket holder's device 110) after the new ticket server signature is generated.

At a step 408, ticket holder's device 110 may obtain the digital ticket and the ticket-server signature. For example, ticket holder's device 110 may receive or retrieve the digital ticket and the ticket-server signature from ticket server 130. In embodiments where a new ticket-server signature is generated after step 404, ticket holder's device 110 may further obtain the new ticket-server signature. In these embodiments, ticket holder's device 110 may replace the previous ticket-server signature with the new ticket-server signature. In some embodiments, at least a portion of the digital ticket may be stored on a secure storage area of ticket holder's device 110.

At an optional step after step 408, ticket holder's device 110 may remove the obtained digital ticket and/or the ticket-server signature. For example, ticket holder's device 130 may remove the obtained digital ticket after the expiration date/time or the valid duration defined in the digital ticket has passed.

At another optional step after step 408, ticket holder's device 110 may synchronize with ticket server 130. During the synchronization, one or more digital tickets previously obtained by ticket holder's device 110 at step 406 may be updated, removed, or marked as being revoked. In one example, ticket server 130 may have obtained an indication that one or more digital tickets obtained by ticket holder's device 110 has been used. In this example, the used digital tickets may be removed during the synchronization with ticket server 130. In another example, ticket server 130 may have received an indication that a ticket holder completed a purchase process to upgrade a previously purchased service or product. In this example, an updated digital ticket may be provided along with an updated ticket-server signature during the synchronization with ticket server 130. In yet another example, ticket server 130 may have received an indication that one or more digital tickets obtained by ticket holder's device 110 have been compromised. In this example, the compromised digital tickets may be marked as being revoked or removed from ticket holder's device 110 during the synchronization with ticket server 130. Ticket holder's device 110 may synchronize with ticket server 130 periodically, after a predetermined amount of time from when the last digital ticket was obtained/generated, and/or upon request by ticket server 130, ticket holder's device 110, or validator 120.

At a step 410, ticket holder's device 110 may obtain a device signature generated at least based on the obtained digital ticket. In some embodiments, the device signature may be generated further based on the ticket-server signature. In some embodiments, ticket holder's device 110 may generate the device signature. Alternatively, ticket holder's device 110 may cause the device signature to be generated and obtain the generated device signature. For example, ticket holder's device 110 may request a signature generator to generate the ticket-server signature and obtain the device signature generated by the signature generator.

The device signature may be generated using device's private key 115. For example, the device signature may be generated by encrypting a hash value of the digital ticket with device's private key 115. In another example, the device signature may be generated by encrypting at least a portion of the digital ticket with device's private key 115.

In some embodiments, device's private key 115 may be a derived private key that is generated by ticket holder's device 110 based on a master key and secret data. The secret data may also be known by the validator 120, thus enabling validator 120 to generate a public key corresponding to the derived public key generated by ticket holder's device 110. In embodiments where ticket holder's device 110 is a general-purpose electronic device executing one or more pieces of software implementing the functions of ticket holder's device 110, the secret data may be included as a part of the pieces of software. For example, the secret data may be provided to ticket holder's device 110 as a part of an app implementing ticket holder's device 110. In some embodiments, the secret data may be changed and the new secret data may be provided to ticket holder's device 110 and validator 120. In some embodiments, the secret data may be changed and provided to ticket holder's device 110 and validator 120 periodically and/or when the secret data is deemed to have been compromised. In these embodiments, the new secret data may be provided to ticket holder's device 110 as a part of an update to the pieces of software implementing ticket holder's device 110, and to validator 120 as a part of a configuration instruction for validator 120 and/or as a part of an update to the pieces of software implementing validator 120.

In some embodiments, the device signature may be generated further based on device data. The device data may include any data available to ticket holder's device 110. For example, the device data may include outputs from one or more sensors, user interfaces, receivers accessible by ticket holder's device 110.

In some embodiments, the device data may include time-dependent data. For example, the device data may include a timestamp representing the time and/or date at which the device signature is generated/obtained. In another example, the device signature may be generated further based on an expiration time/date of the digital ticket, which may be a predetermined amount of time (e.g., 2 minutes) after the device signature is generated.

In some embodiments, the device data may include a timestamp representing the time and/or date at which ticket holder's device 110 has last synchronized with ticket server 130.

In some embodiments, the device data may include data indicative of a location-dependent data. For example, the device data may include the current location (e.g., a GPS coordinate) of ticket holder's device 110. Ticket holder's device 110 may have obtained the current location from a GPS receiver included in, or otherwise accessible by, ticket holder's device 110.

In some embodiments, ticket holder's device 110 may generate a new device signature based on the same digital ticket and/or the ticket-server signature. For example, ticket holder's device 110 may generate a new device signature after a predetermined time from when the last device signature was generated. In another example, ticket holder's device 110 may generate a new device signature upon obtaining an updated digital ticket and/or ticket-server signature from ticket server 130. In yet another example, ticket holder's device 110 may generate a new device signature in response to an input from the ticket holder (e.g., to provide the digital ticket to validator 120). In embodiments where the device signature is generated based on time-dependent data, the new device signature may be different from the previous device signature, even though the new device signature is generated based on the same digital ticket and/or the same ticket-server signature.

At a step 412, ticket holder's device 110 may provide the digital ticket, the ticket-server signature, and the device signature. In embodiments where the device signature is based on the device data, ticket holder's device 110 may further provide the device data.

In some embodiments, ticket holder's device 110 may provide the digital ticket, the ticket-server signature, and the device signature in response to an input from the ticket holder. In some embodiments, ticket holder's device 110 may provide the digital ticket, the ticket-server signature, and the device signature after ticket holder's device 110 is placed near validator 120. In some embodiments, ticket holder's device 110 may provide the digital ticket, the ticket-server signature, and the device signature in response to a request from validator 120. In some embodiments, ticket holder's device 110 may provide the digital ticket, the ticket-server signature, and the device signature after ticket holder's device 110 is detected by one or more beacons (e.g., Bluetooth beacons). In some embodiments, ticket holder's device 110 may provide the digital ticket, the ticket-server signature, and the device signature in response to ticket holder's device 110 completing step 410 (i.e., obtaining the device signature). For example, ticket holder's device 110 may provide the digital ticket, the ticket-server signature, and the device signature immediately after obtaining the device signature.

In some embodiments, the digital ticket, the ticket-server signature, and the device signature provided may be provided using a data format that cannot be readily read and understood by a human being. For example, the digital ticket, the ticket-server signature, and the device signature may be obfuscated. By providing the data using a data format that cannot be readily read and understood by a human being, a simple interception of the data originating from ticket holder's device 110 may not suffice to reverse engineer the data to and fraudulently generate/provide digital tickets.

As discussed above, ticket holder's device 110 may provide the digital ticket, the ticket-server signature, and the device signature by transmitting them, for example, to validator 120. Alternatively, or additionally, provide the digital ticket, the ticket-server signature, and the device signature by making them available for retrieval by validator 120. For example, ticket holder's device 110 may encode the digital ticket, the ticket-server signature, and the device signature as one or more barcodes and/or QR codes, and display the barcodes/QR codes on a display included in, or connected to, ticket holder's device 110. Validator 120 may subsequently retrieve the digital ticket, the ticket-server signature, and the device signature by capturing and decoding the barcodes/QR codes.

In embodiments where ticket holder's device 110 further provides time-dependent device data, the generated barcode/QR code may be time dependent. That is, the barcodes and QR codes generated at two different times may or may not have different barcodes/QR codes for the same digital ticket. In embodiments where ticket holder's device 110 includes location-dependent device data, the generated barcode/QR code may be location dependent. That is, barcodes and QR codes generated at two different locations will have different barcodes/QR codes for the same digital ticket. Barcodes and QR codes that are time and/or location dependent may prevent a person from copying the barcode/QR code (e.g., by taking a screenshot or a photograph) and presenting the copied, fraudulent barcode/QR code.

At a step 414, validator 120 may obtain the digital ticket, the ticket-server signature, and the device signature. In some embodiments, validator 120 may further obtain the device data.

At a step 416, validator 120 may validate the digital ticket. For example, validator 120 may determine whether the digital ticket is valid or not.

Validator 120 may determine that the digital ticket is valid after verifying the ticket-server signature and the device signature. In some embodiments, validator 120 may verify the device signature and then the ticket-server signature. Verifying the ticket-server signature ensures that: (i) the digital ticket has indeed been signed by ticket server 130, and (ii) the digital ticket has not been altered since it was signed by ticket server 130. Verifying the device signature further ensures that the digital ticket is indeed provided by ticket holder's device 110 (i.e., an authorized device). Therefore, verifying the ticket-server signature and the device signature ensures that the digital ticket was not fraudulently obtained from an entity other than ticket server 130 and that the digital ticket was not fraudulently provided using an unauthorized means (e.g., by an entity other than ticket holder's device 110).

The ticket-server signature may be verified using ticket server's public key 137. In an example where the ticket-server signature is generated by encrypting a cryptographic hash value of the digital ticket with ticket server's private key 135, the ticket-server signature may be verified using cryptographic hashing with ticket data, the ticket-server generated signature and the ticket server's public key 137. A match between the ticket-server signature and the generated hash value of the digital ticket may indicate that: (i) the digital ticket was generated by an entity with access to ticket server's private key 137 (e.g., ticket server 130), and (ii) the digital ticket has not been altered since the ticket-server signature was generated by the entity.

The device signature may be verified using device's public key 117. In an example where the device signature is generated by encrypting a hash value of the digital ticket with device's private key 115, the device signature may be verified by decrypting the device signature with device's public key 117, generating a hash value of the digital ticket, and comparing the decrypted device signature with the generated hash value of the digital ticket. A match between the decrypted device signature and the generated hash value of the digital ticket may indicate that (i) the digital ticket was generated by an entity with access to device's private key 115 (i.e., ticket holder's device 110), and (ii) the digital ticket has not been altered since the device signature was generated by the entity.

In some embodiments, validator 120 may determine that the digital ticket is valid after determining that the digital ticket has not expired. For example, validator 120 may determine that the digital ticket is valid after determining that the digital ticket has not expired based on the expiration date/time or the valid duration defined in the digital ticket.

In some embodiments, validator 120 may determine that the digital ticket is valid after determining that the device signature and/or the ticket-server signature has not expired. For example, validator 120 may determine that the digital ticket is valid after determining that the device signature and/or the ticket-server signature was generated within a predetermined amount of time or within an amount of time defined in the digital ticket or the device data provided by ticket holder's device 110 or by business rules specified by the ticket issuing agency.

In embodiments where the digital ticket is provided using a barcode or a QR code, validator 120 may determine that the digital ticket is valid after determining that the barcode or the QR code was generated within a predetermined amount of time (e.g., within 2 minutes of the current time). A short valid duration (e.g., 2 minutes) may decrease the likelihood that a digital ticket reproduced using an unauthorized means (e.g., by copying) is determined valid by validator 120.

In some embodiments, validator 120 may determine that the digital ticket is valid after determining that ticket holder's device 110 synchronized with ticket server 130 at least once within a predetermined amount of time (e.g., in the last 8 hours). In these embodiments, validator 120 may detect fraudulent digital tickets obtained and provided using a "replay attack." A replay attack may involve a person restoring a backup of ticket holder's device 110 that was made prior to using the digital ticket; the digital ticket is indicated as unused in the backup of ticket holder's device 110. By ensuring that ticket holder's device 110 has been synchronized with ticket server 130 recently, ticket holder's device 110 is likely to be at the latest state. That is, the synchronization ensures, for example, that used digital tickets are removed from ticket holder's device 110 or indicated as having been used on ticket holder's device 110. Thus, the likelihood that a digital ticket obtained and/or provided using an unauthorized means (e.g., by restoring a ticket holder's device 110 backup that includes an unused digital ticket) is determined as being valid by validator 120 is decreased.

In embodiments where the device signature is based on a timestamp representing the time and/or date at which the device signature is provided or a timestamp representing an expiration time/date of the device signature or the digital ticket, the verification of the device signature may include verifying that the device signature has not expired based on the timestamp.

In some embodiments, validator 120 may validate the digital ticket based on configuration data associated with validator 120. In an example where validator 120 is deployed on a vehicle, the configuration data associated with validator 120 may include route information of the vehicle associated with validator 120. In this example, validator 120 may determine that the digital ticket is valid if the products/services associated with the digital ticket is authorized for the route of the vehicle. In some embodiments, the configuration data may be obtained using the same method as the digital ticket. For example, the configuration data may be obtained by capturing and decoding a barcode or a QR code encoded with the configuration data. In these embodiments, the barcode or the QR code may be provided by an operator's device or a maintenance card carried by an operator. The operator may be, for example, a driver of the vehicle associated with validator 120.

In some embodiments, validator 120 may validate the digital ticket based on ticket-server data, which may be obtained from ticket server 130. The ticket-server data may include, for example, data indicative of whether the digital ticket has already been used and/or whether the digital ticket is currently listed in a negative list. Validator 120 may determine that the digital ticket is invalid if the digital ticket has been recorded as being used and/or if the digital ticket is currently listed in a negative list.

In some embodiments, in addition to digital tickets (or identifiers of digital tickets), the negative list may further include, for example, identifiers of ticket holder's devices and/or validators. Validator 120 may determine that a digital ticket is invalid if ticket holder's device 110 and/or validator 120 is identified in the negative list. In some embodiments, the negative list may be updated periodically, when requested by validator 120, and/or when validator 120 is turned on or restarted.

In embodiments where the device data provided by ticket holder's device 110 includes a location of ticket holder's device 110, validator 120 may determine that the digital ticket is valid after determining that the current location of validator 120 is within a predetermined distance from the provided location of ticket holder's device 110. In these embodiments, validator 120 may include, or have access to, a GPS receiver for determining the current location of validator 120. By verifying that the current location of validator 120 is within a predetermined distance from the provided location of ticket holder's device 110, the likelihood that a digital ticket fraudulently reproduced using an unauthorized means (e.g., by copying) is determined valid by validator 120 is reduced.

In some embodiments, validator 120 may validate the digital ticket using data that were previously obtained from other ticket holders' devices. For example, validator 120 may maintain records of digital tickets that were previously validated by validator 120 or by a group of validators that validator 120 is a part of. In this example, validator 120 may determine that a digital ticket is invalid if the same digital ticket is recorded as having been used. By maintaining such records, validator 120 may detect when ticket holder's device 110 is used multiple times by multiple people (e.g., by physically sharing ticket holder's device 110 among them) to provide the same digital ticket to validator 120. In some embodiments, validator 120 may maintain records of digital tickets that were previously validated within a predetermined amount of time (e.g., last 10 minutes). In some embodiments, such records may be synchronized across multiple validators periodically. In situations where records from other validators are unavailable (e.g., because validator 120 is offline), validator 120 may rely on the local records of digital tickets that were previously validated by validator 120.

At an optional step, validator 120 may provide ticket server 130 an indicator that the digital ticket has been validated at validator 120. The indicator may include, for example, whether the digital ticket was determined to be valid or invalid, time and/or date of the validation, location of validator 120 at the time of the validation, one or more data included in the digital ticket and/or device data, raw data provided by ticket holder's device 110, an identifier of validator 120, methods used for obtaining data from ticket holder's device 110, and/or an identifier of ticket holder's device 110.

In some embodiments, an indicator may be provided to ticket server 130 after every time the digital ticket is validated at validator 120. Alternatively, indicators may be provided to ticket server 130 in batch. For example, indicators may be provided to ticket server 130 after validating a predetermined number of digital tickets and/or periodically.

As discussed above, in some situations, validator 120's ability to communicate with ticket server 130 may be interrupted. For example, validator 120 may be inside a vehicle passing through an underground tunnel. Thus, in some embodiments, when validator 120's ability to communication with ticket server 130 is interrupted, validator 120 may store the indicators destined for ticket server 130 until the communication with ticket server 130 is restored. After the communication with ticket server 130 is restored, the stored indicators may be provided to ticket server 130 in batch.

At another optional step, ticket server 130 may update the digital ticket based on the obtained indicator(s). In one example, ticket server 130 may remove the digital ticket on ticket server 130 and/or cause removal of the digital ticket on ticket holder's device 110.

At a step 418, validator 120 may provide an instruction to access control device 140. The instruction may be generated based on the result of the validation at step 416.

At a step 420, access control device 140 may generate an output based on the instruction provided by validator 120. As discussed above, the generated output may be indicative of whether a person is permitted or denied from proceeding beyond the location of access control device 140. For example, access control device 140 may be a gate or a door. The gate or door may be signaled to close/remain close and/or open/remain open. Additionally, or alternatively, access control device 140 may include a speaker that produces a sound, and the produced sound may be indicative of whether a person is permitted or denied from proceeding. In some embodiments, access control device 140 may include a display monitor that displays a visual content indicative of whether a person is permitted or denied from proceeding. In some embodiments, access control device 140 may include one or more light emitting devices, and access control device 140 may turn on or off one or more light emitting devices to indicate whether the rider is permitted or denied form proceeding.

Example Software Provisioning Processes

Figure 5:
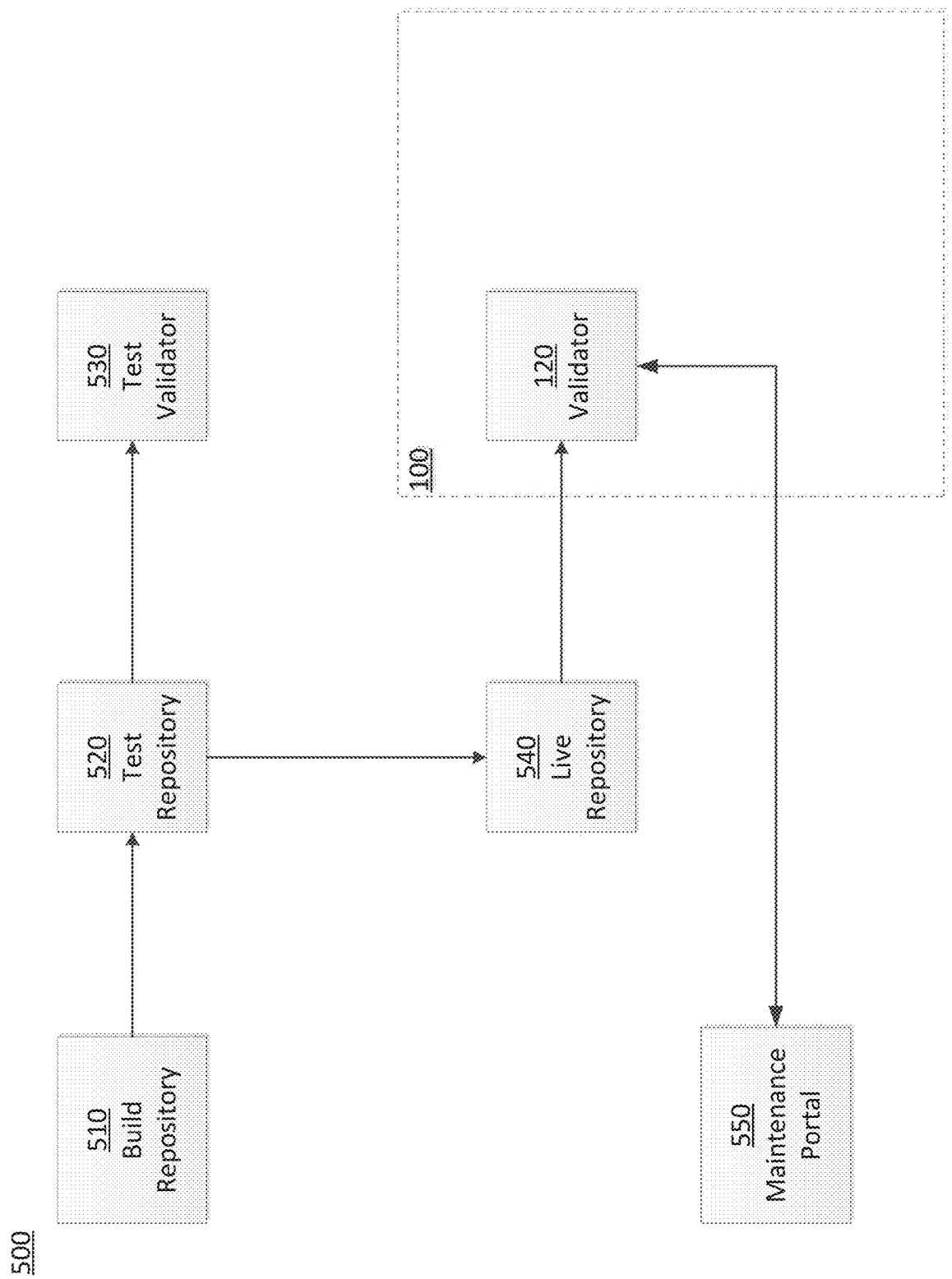
FIG. 5 illustrates a process for provisioning software to a validator in accordance with the disclosed embodiments.

FIG. 5 illustrates an example of a system 500 for provisioning new software on validator 120 of system 100. In addition to validator 120, system 500 includes a build repository 510, a test repository 520, a test validator 530, a live repository 540, and a maintenance portal 550.

Build repository 510 may include one or more builds of software for validator 120. For example, build repository 510 may include the latest build of software for validator 120. As shown in FIG. 5, build repository 510 may provide a build of software for validator 120 to test repository 520. The build of software may be transmitted or made available for retrieval.

In system 500, when a new build of software is obtained by test repository 520, test validator 530 may be configured to update its software with the new build obtained by test repository 520. In some embodiments, test validator 530 may detect that new build is obtained by test repository 520. Alternatively, or additionally, test repository 520 may notify test validator 530 that a new build has been obtained and cause test validator 530 to update the software. In some embodiments, test validator 530 may update the software during an initialization stage (e.g., when test validator 530 is turned on or restarted).

After test validator 530 is updated with the new build of the software, test validator 530 may be tested. For example, test validator 530 may be tested with various known valid and invalid digital tickets and the validation results may be compared with the expected results. In another example, test validator 530 may be field tested.

After determining that the new build of the software is ready to be distributed to validator 120 in system 100, the new build may be provided to live repository 540. Similar to test validator 530, when a new build of software is obtained by live repository 540, validator 120 may be configured to update its software with the new build obtained by live repository 540. In some embodiments, the new build may be provided by test repository. Alternatively, the new build may be provided by build repository 510. In some embodiments, validator 120 may detect that a new build is obtained by live repository 540. Alternatively, or additionally, live repository 540 may notify validator 120 that a new build has been obtained. In some embodiments, validator 120 may update the software during an initialization stage (e.g., when validator 120 is turned on or restarted).

Repositories 510, 520, and/or 540 may be implemented on one or more physical and/or virtual servers. In some embodiments, repositories 510, 520, and/or 540 may be implemented on a cloud platform. For example, repositories 510, 520, and/or 540 may be implemented on Amazon Web Services S3 platform.

Maintenance portal 550 may connect to validator 120 and cause validator 120 to execute custom processes and/or one or more of the predefined processes. Such processes may be maintenance related processes. For example, maintenance portal 550 may cause validator 120 to restart, execute a self-diagnostic process, and/or transmit a log to another entity. In some embodiments, maintenance portal 550 may connect to validator 120 using secure shell (SSH).

Limited-Use Tokens

Figure 6:
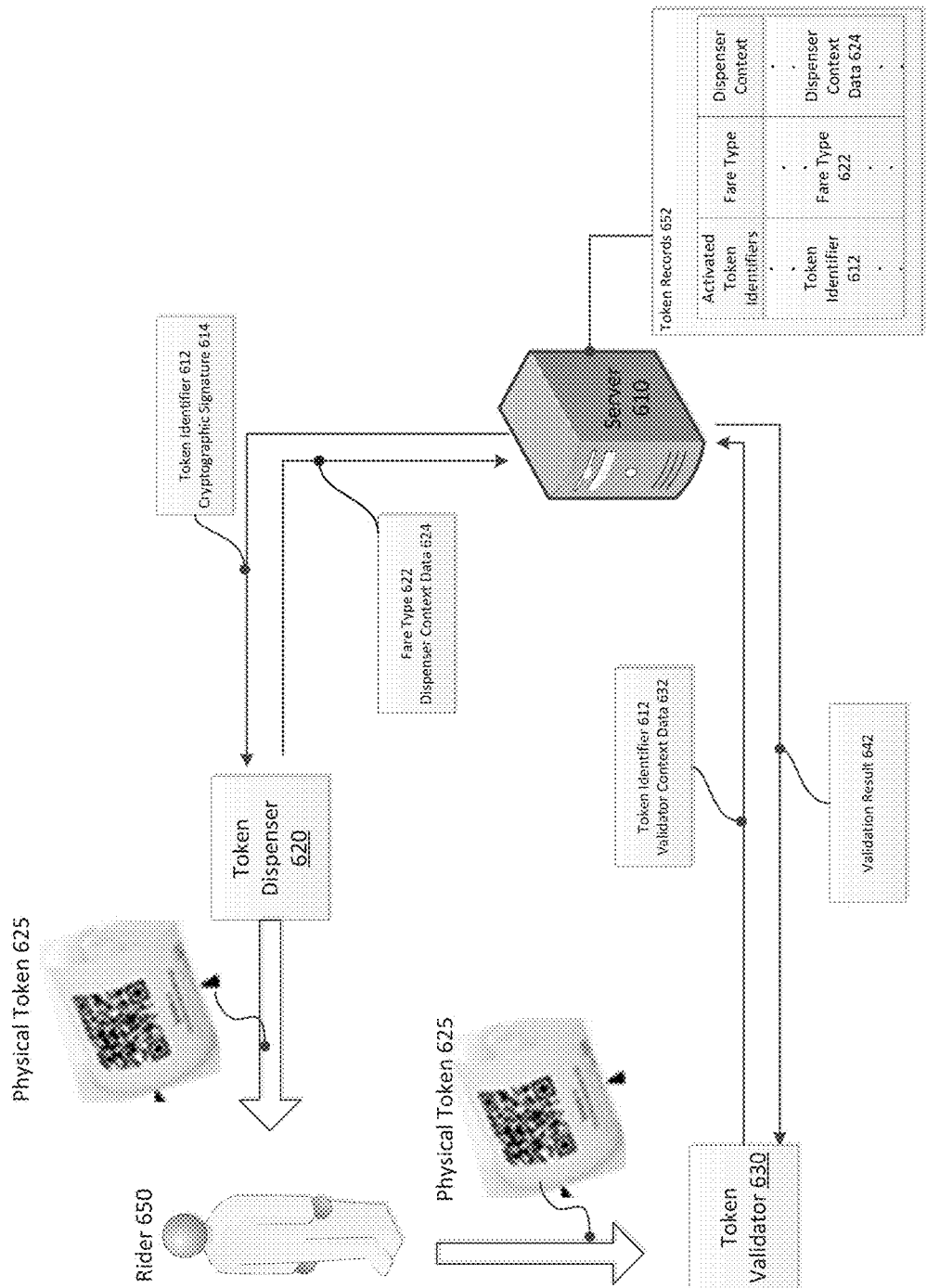
FIG. 6 illustrates an example of a system for facilitating use of physical tokens in a transit system in accordance with the disclosed embodiments.

FIG. 6 illustrates an example of a system 600 for facilitating use of physical tokens in a transit system in accordance with the disclosed embodiments. As shown in FIG. 6, system 600 includes a token server 610, a token dispenser 620, and a token validator 630. FIG. 6 also shows a rider 650.

Overview

In the example of FIG. 6, rider 650 may be a person in a transit station intending to travel to another transit station using a transit vehicle (e.g., a train or a bus). To enter a boarding area of the transit station (e.g., a train platform) and/or to board a vehicle, rider 650 may need to purchase and obtain a physical token 625 from token dispenser 620. In system 600, physical token 625 may be a limited-use token that is associated with a set of restrictions governing its use (e.g., single-day token, single-ride token, route-specific token, direction-specific token).

In FIG. 6, token dispenser 620 may be placed at an entrance of the transit station or vehicle. Further, token dispenser 620 may be configured to receive a selection of a fare type 622 and accept/process a payment for a fare from rider 650. For example, token dispenser 620 may include a user interface (e.g., touchscreen display) that can be used by rider 250 to select a fare type 622 from a list of fare types available for the transit station, and a payment subsystem that can accept various payment methods (e.g., credit cards, cash, cryptocurrencies) from rider 650.

Furthermore, token dispenser 620 may be configured to create, activate, and dispense physical token 625. In particular, token dispenser 620 may create physical token 625 that is capable of providing a token identifier 612 and a cryptographic signature 614 (generated based on token identifier 612) to token validator 630 (e.g., a paper-based token having a barcode, a paper-based token with an NFC tag). Token dispenser 620 may activate physical token 625, for example, by causing server 610 to record that token identifier 612 associated with physical token 625 is activated and associated with fare type 622 selected by rider 250.

In some embodiments, instead of, or in addition to, creating physical token 625, token dispenser 620 may generate digital token data including token identifier 612 and cryptographic signature 614 and transmit the digital token data to a device of rider 650. In these embodiments, the device of rider 650 may generate an output encoded with token identifier 612 and cryptographic signature 614 such that the output can be captured and decoded by token validator 630. The output may include, for example, a barcode displayed on a display of the device, a sound clip played using a speaker of the device, and/or a transmission by a transmitter (e.g., NFC, Wi-Fi, Bluetooth) of the device. As used herein, a "digital token" refers to a device (e.g., mobile device) that is programmed by a token dispenser 620 to dynamically output (e.g., based on a user's input) token identifier 612 and cryptographic signature 614 in a manner that can be obtained by token validators 630. In some embodiments, token dispenser 620 may transmit the digital token data to the device of rider 650 using audio-based communications described below with respect to FIG. 11.

Subsequently, token dispenser 620 may dispense physical token 625 to rider 650, and rider 650 may present the dispensed physical token 625 (or the digital token) to token validator 630, for example, placed at an entrance/exit of a transit station/platform or a vehicle. Token validator 630 may validate the presented physical token 625 to ensure that the physical token 625 complies with the associated set of restrictions and that physical token 625 is not being used fraudulently. In validating physical token 625, token validator 630 may leverage data available to the validator (e.g., location of the validator) as well as data available to server 610 (e.g., whether physical token 625 is recorded as being activated), if available. Once validated by token validator 630, rider 520 may be permitted to enter or exit the platform/vehicle.

Token Dispenser and Token Server

As discussed above, token dispenser 620 may be configured to receive a selection of fare type 622 from rider 650. For example, token dispenser 620 may include a touchscreen display that can be used by rider 650 to select fare type 622 from a list of fare types available at a particular token dispenser 620 (or a particular transit station). Each fare type may determine a set of restrictions that would become associated with physical token 625 and govern its use. For example, fare type 622 may impose restrictions on time periods (e.g., off-peak hours, weekdays) in which physical token 625 may be used. In another example, fare type 622 may impose restrictions on locations (e.g., entering/exiting/transferring at specific transit stations) where physical token 625 may be used. In yet another example, fare type 622 may impose restrictions on travel routes (e.g., travel direction, travel distance) that can be traveled using physical token 625.

After receiving the selection of fare type 622, token dispenser 620 may calculate a fare based on the selection of fare type 622. For example, token dispenser 620 may use a predetermined formula associated with fare type 622 and/or a fare lookup table to calculate the fare. Furthermore, token dispenser 620 may also include a payment subsystem that can accept and/or process various forms of payment (e.g., cash, credit/debit cards, cryptocurrency) provided by rider 650 to pay the calculated fare.

Token dispenser 620 may be further configured to activate (or cause activation of) token identifier 612 that is associated, or will be associated, with a physical token 625. In the example of FIG. 6, token dispenser 620 may cause server 610 to activate token identifier 612 by transmitting the selection of the fare type 622 and dispenser context data 624 to server 610. Dispenser context data 624 may be any data indicative of context in which token identifier 612 will be activated. For example, dispenser context data 624 may include a location of token dispenser 620 (i.e., dispense location), a time/date when the payment is accepted/processed (i.e., dispense time), an identifier associated with dispenser 620, and/or a type of physical token 625 dispensed by token dispenser 620 (e.g., paper token, RFID-based token).

In response, server 610 may generate token identifier 612 and an associated cryptographic signature (i.e., generated based on token identifier 612). Alternatively, token identifier 612 may be generated by a token-identifier generator connected to server 610, and the token-identifier generator may transmit the generated token identifier 612 to server 610. The cryptographic signature 614 may be generated, for example, using a private key associated with server 610. In some embodiments, the private key may be accessible to server 610, and server 610 may generate the cryptographic signature 614. Alternatively, or additionally, server 610 may transmit token identifier 612 to a signature generator that can access the private key. The signature generator may generate cryptographic signature 614 based on token identifier 612 and transmit cryptographic signature 614 and/or token identifier 612 to server 610. The generated token identifier 612 and cryptographic signature 614 are subsequently transmitted to token dispenser 620 by server 610.

Additionally, server 610 may record that token identifier 612 is now activated and associated with a fare type 622 selected by rider 650. Further, server 610 may store and associate the received dispenser context data 624 with token identifier 612. As shown in FIG. 6, for example, server 610 may create an entry in token records 652 listing that token identifier 612 is associated with the selected fare type 622 and dispenser context data 624.

After receiving token identifier 612 and the associated cryptographic signature 614, token dispenser 620 may create physical token 625. Physical token 625 may be configured to provide token identifier 612 and the associated cryptographic signature 614 in a manner that can be received by token validators 630. For example, token dispenser 620 may include a printer, and token dispenser 620 may be configured to print, using the printer, a paper-based token with a barcode (e.g., QR code, AZTEC) that can be read by a barcode reader included in, or otherwise connected to, token validator 630. In another example, token dispenser 620 may include an RFID writer/programmer. In this example, token dispenser 620 may be configured to program an RFID included in an RFID-based token to transmit token identifier 612 and the associated cryptographic signature 614 in a format that can be received by an RFID reader included in, or otherwise connected to, token validator 630.

In some embodiments, physical token 625 may be further configured to provide token validator 630 with data indicative of the associated fare type 622, at least a subset of the restrictions governing the use of physical token 625 (e.g., expiration date, permitted travel direction, permitted transit stations/platforms for entry/exit, permitted routes), and/or at least a portion of dispenser context data 624 (e.g., dispense location/time, dispenser identifier). After physical token 625 is created, token dispenser 620 may dispense physical token 625 for use by rider 650.

Token Validator

As discussed above, rider 650 may present physical token 625 to token validator 630 to enter a transit station, a transit platform, or a transit vehicle. Additionally, or alternatively, rider 650 may present physical token 625 to token validator 630 to exit a transit station, a transit platform, or a transit vehicle. In some embodiments, rider 650 may present physical token 625 to token validator 630 implemented on a mobile device, for example, operated by an employee of the transit system. In some embodiments, a person other than rider 650 may present token 625 (physical or digital) to token validator 630. For example, token 625 may have been transferred or sold by rider 650 to another person. In embodiments where token 625 is a digital token, rider 650 may have transferred physical token 625 to another person using, for example, audio-based communications described below with respect to FIG. 11.

When physical token 625 is presented, token validator 630 may receive token identifier 612 and cryptographic signature 614 provided by physical token 625. Subsequently, token validator 630 may verify cryptographic signature 614 using a public key associated with server 610. Before, during, and/or after verifying the cryptographic signature 614, token validator 630 may request server 610 to validate physical token 625 (or token identifier 612 associated with physical token 625). In these embodiments, token validator 630 may transmit the received token identifier 612, and optionally, validator context data 632 to server 610. Validator context data 632 may be indicative of context in which physical token 625 is being validated. For example, validator context data 632 may include a location of token validator 630 and/or time/date at which physical token 625 is presented to token validator 630 (i.e., validation time). In some embodiments, validator context data 632 may include an identifier associated validator 630. In some embodiments, validator context data 632 may include identifiers of a trip, operator, vehicle, route, stop, validator vendor, validator version, and/or validator product. In some embodiments, validator context data 632 may include a number of tokens validated by validator 630 during a predetermined range of time.

After receiving the request, server 610 may access fare type 622 and dispenser context data 624 associated with the received token identifier 612 (e.g., by looking up token records 652), and based on the received validator context data 632, accessed fare type 622, and/or accessed dispenser context data 624, server 610 may determine whether physical token 625 associated with token identifier 612 is valid. In particular, server 610 may determine a set of restrictions governing the use of physical token 625 based on fare type 622, and determine, based on the validator context data 632 and the dispenser context data 624, whether the use of physical token 625 at token validator 630 complies with the set of restrictions. For example, physical token 625 may be associated with a route-specific fare type 622. Here, server 610 may determine whether the validation location included in validator context data 632 is appropriate for the specified route. In another example, physical token 625 may be associated with fare type 622 that can only be used for one hour immediately after the token is dispensed. In this example, server 610 may determine whether the dispense time included in dispenser context data 624 is within one hour of the current time.

In some embodiments, server 610 may store records pertaining to prior token validations. For example, server 610 may store records of token identifiers that have been validated by server 610, including the times and dates of validations, the received validator context data, and/or validation results. In these embodiments, server 610 may determine whether physical token 625 associated with token identifier 612 is valid further based on these records. For example, physical token 625 may be associated with a single-use fare type 622 that can only be used once to enter a transit station. Thus, server 610 may determine, based on the records pertaining to prior token validations, whether physical token 625 has been successfully validated before. In another example, physical token 625 may be associated with fare type 622 that cannot be used for a transfer. Thus, server 610 may determine, based on the records pertaining to prior validations and/or various data included in dispenser context data 624 and validator context data 632, whether physical token 625 is being used for a transfer at token validator 630. In yet another example, physical token 625 may be associated with fare type 622 that can only be used for south-bound travels. Here, server 610 may first determine the location of the initial transit station, for example, by accessing records pertaining to prior token validations and identifying the last successful validation of the same physical token 625. Further, server 610 may determine whether the location of token validator 630 included in validator context data 632 is south of the identified initial transit station.

In some embodiments, server 610 may store a list of token identifiers that can no longer be used (i.e., "negative list). Such a list may include, for example, tokens identifiers of tokens that are known to be involved in a fraud. In these embodiments, server 610 may determine whether physical token 625 associated with token identifier 612 is valid further based on such a list. In particular, server 610 may determine that physical token 625 is invalid if the associated token identifier 612 is included in the negative list. In some embodiments, token validator 630 may maintain a copy of the negative list that may be received from, and/or updated (e.g., in real time or periodically) by, server 610. In these embodiments, token validator 630 may determine that physical token 625 is invalid if the associated token identifier 612 is included in the copy of the negative list stored on token validator 630 and/or the negative list stored in server 610.

As discussed above, in some embodiments, physical token 625 may be further configured to provide data indicative of the associated fare type 622, at least a subset of the restrictions governing the use of physical token 625, and/or at least a portion of dispense context data 624. In these embodiments, token validator 630 may validate physical token 625, at least in part, based on these data. For example, in one embodiment, physical token 625 may be further configured to provide an expiration date, and token validator 630 may determine, based on the expiration date, whether physical token 625 has expired. In another example, physical token 625 may provide a list of transit stations that physical token 625 can be used to enter/exit. In this example, token validator 630 may determine whether the transit station in which token validator 630 is placed is on such a list.

In some embodiments, token validator 630 may validate physical token 625 based on the data provided by physical token 625 without relying on server 610. For example, after determining that server 610 is unreachable, or otherwise unavailable, token validator 630 may start validating physical token 625 solely based on the data provide by physical token 625. In some embodiments, after determining that server 610 is available again, token validator 630 may start requesting server 610 to at least partially validate physical token 625.

In some embodiments, token validator 630 and/or server 610 may validate physical token 625 by verifying that physical token 625 is not being used fraudulently. In one example, physical token 625 may be configured (e.g., by token dispenser 620) to provide the dispense time and/or location to token validator 630, and token validator 630 and/or server 610 may determine whether the provided dispense time and/or location are reasonable in view of the current time and location of token validator 630 (e.g., determine whether the speed at which rider 650 would need to have traveled from the dispense location to the location of token validator 630 is reasonable or theoretically possible). In another example, token validator 630 and/or server 610 may determine whether physical token 625 was validated at the same token validator 630 and/or another validator in the last two hours. In this example, token validator 630 may prevent fraudulent use of physical token 625 involving one rider passing physical token 625 to another rider to reuse physical token 625.

In embodiments where physical token 625 is associated with a fare type restricting its use for a trip to a predetermined destination, after token validator 630 at the initial transit station validates physical token 625, token validator 630 located at the destination may be provided (e.g., by server 610) with the token identifier associated with physical token 625. Token validator 630 at the destination may validate physical token 625 if the associated token identifier was received within a predetermine amount of time.

Figure 7:
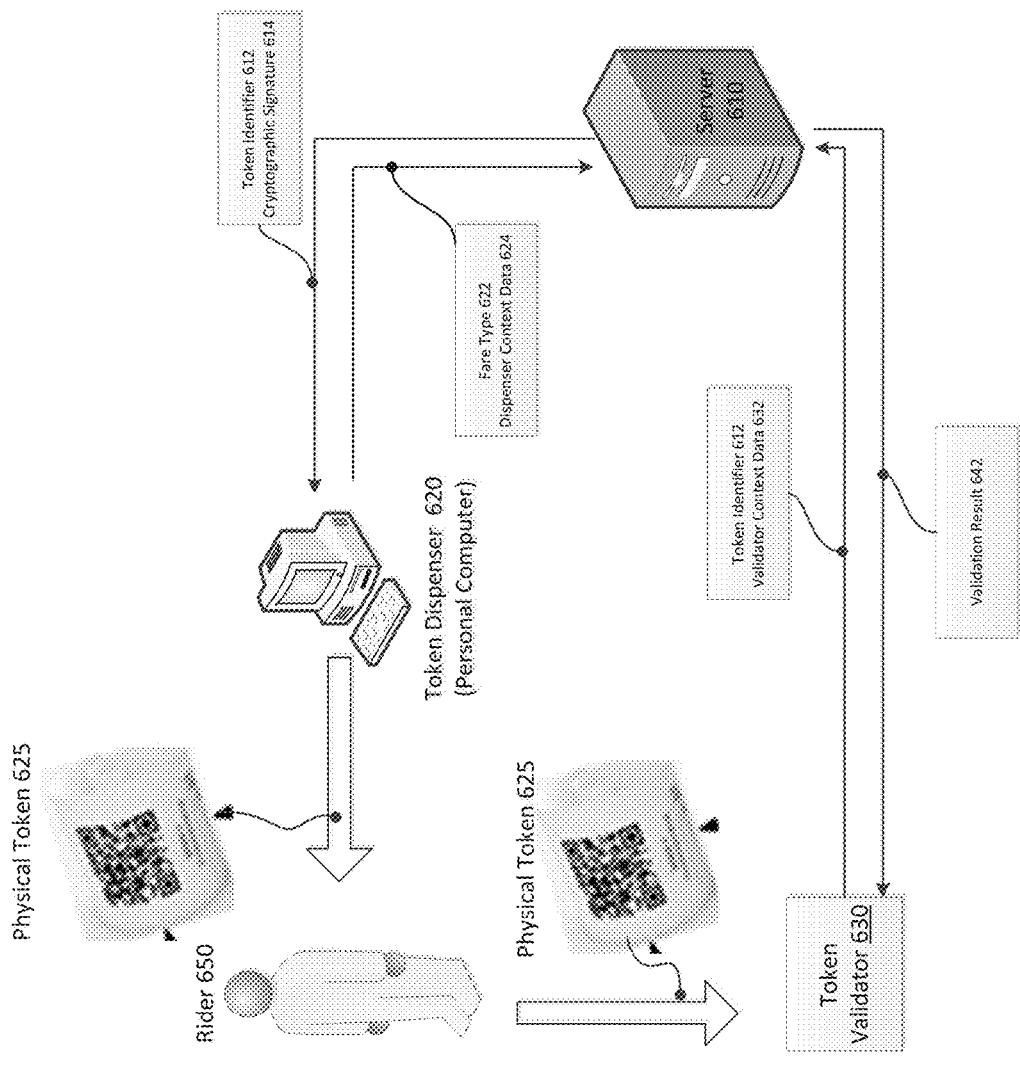
FIG. 7 illustrates another example of a system for facilitating use of physical tokens in a transit system in accordance with the disclosed embodiments.

FIG. 7 illustrates another example of a system 700 for facilitating use of physical tokens in a transit system in accordance with the disclosed embodiments. System 700 is similar to system 600 of FIG. 6, except that token dispenser 620 is a personal computer with a printer. Thus, physical token 625 may be created and dispensed at more convenient locations/times for rider 650. For example, physical token 625 may be created/dispensed and activated using a personal computer located in rider 650's home. Alternatively, or additionally, in some embodiments, token dispenser 620 may be a mobile device operated by rider 650. Thus, rider 650 may use the mobile device and, for example, a public printer in a public library to create/dispense and activate physical token 625.

Figure 8:
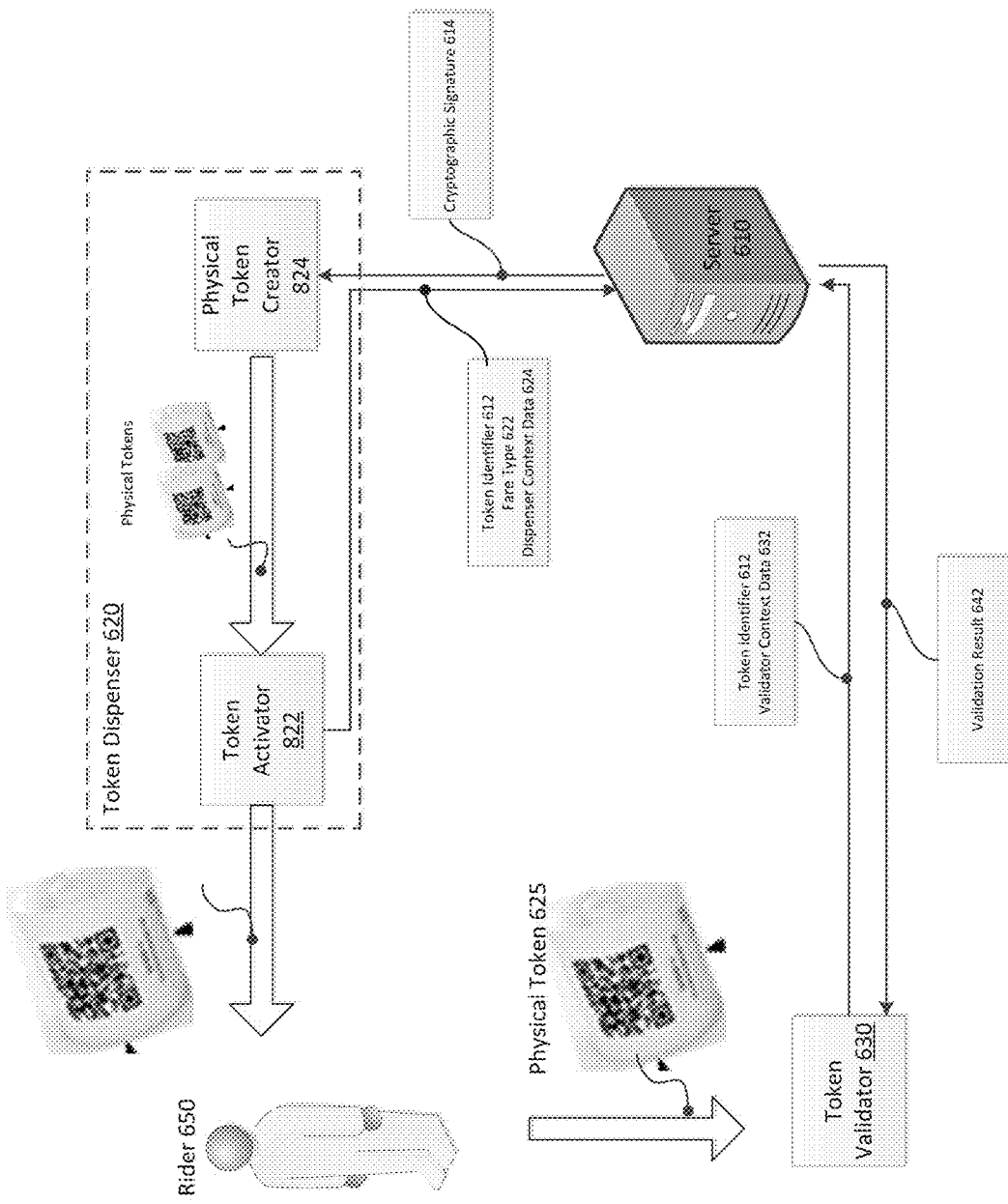
FIG. 8 illustrates another example of a system for facilitating use of physical tokens in a transit system in accordance with the disclosed embodiments.

FIG. 8 illustrates another example of a system 800 for facilitating use of physical tokens in a transit system in accordance with the disclosed embodiments. System 800 is similar to system 600 of FIG. 6, except that token dispenser 620 in FIG. 8 includes a physical token creator 822 and a token activator 824 that are separated from each other. In the example of FIG. 8, physical token creator 822 may be located away from a transit station and include high-throughput printers for creating a large batch of paper-based physical tokens. In another example, physical token creator 822 may include a set of specialized equipment for programming a large batch of proprietary RFID-based physical tokens. Such equipment may be too large and/or expensive to be included in every token dispensers 620 that are entirely located in transit stations.

In these examples, the batch of pre-created physical tokens may be transported and loaded to token activator 620 located in transit stations. Thus, a single physical token creator 822 may provide physical tokens to multiple token activators thereby reducing cost of building/operating token dispensers 620.

In these embodiments, token activator 620 may activate physical token 625 by first obtaining a token identifier 612 associated with a pre-created physical token 625 that is to be dispensed, and transmitting the token identifier 612 along with selected fare type 622 to server 610. Server 610, rather than generating and activating a new token identifier 612, may activate the received token identifier 612.

Figure 9:
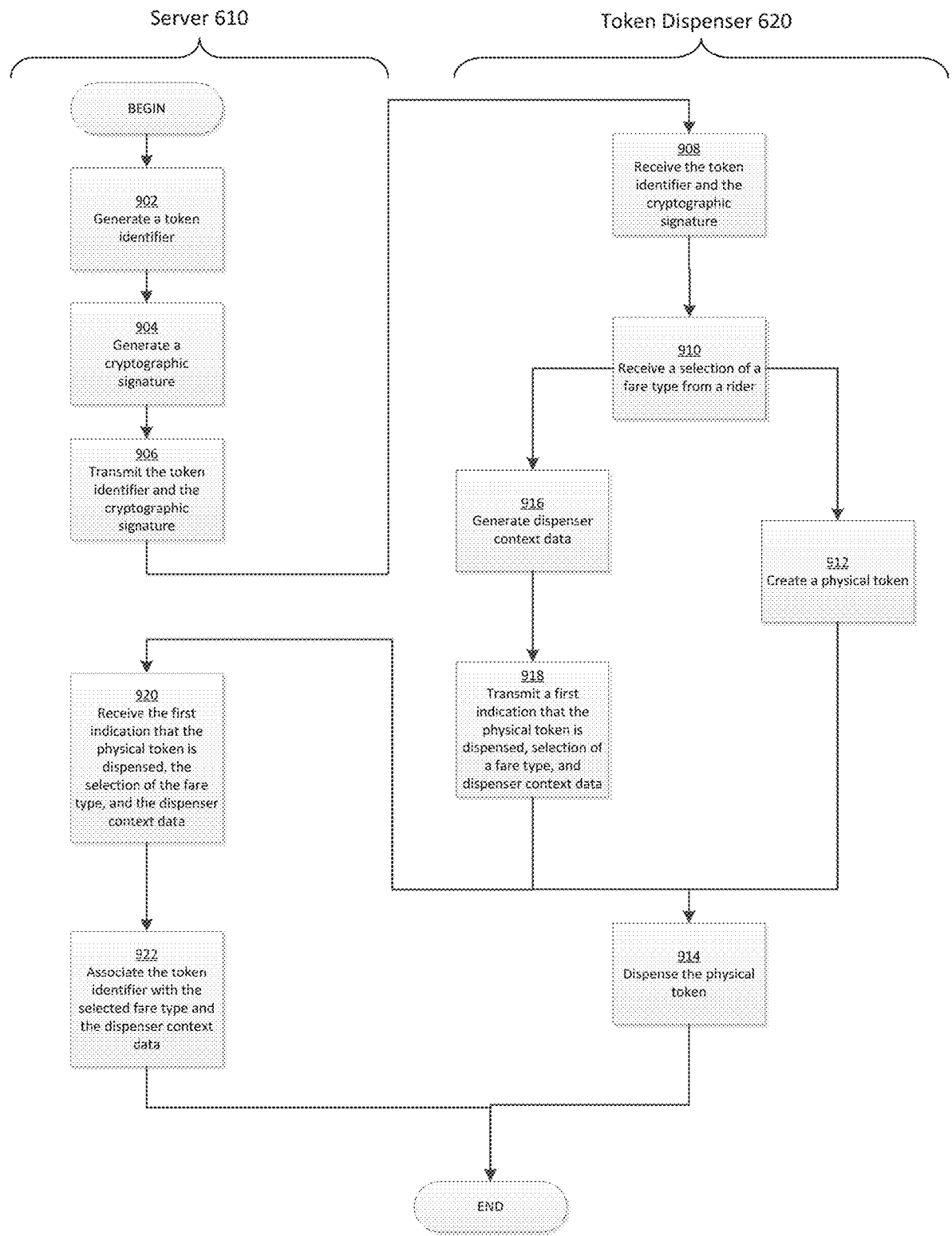
FIG. 9 illustrates a process for creating, activating, and dispensing a physical token in accordance with the disclosed embodiments.
Figure 10:
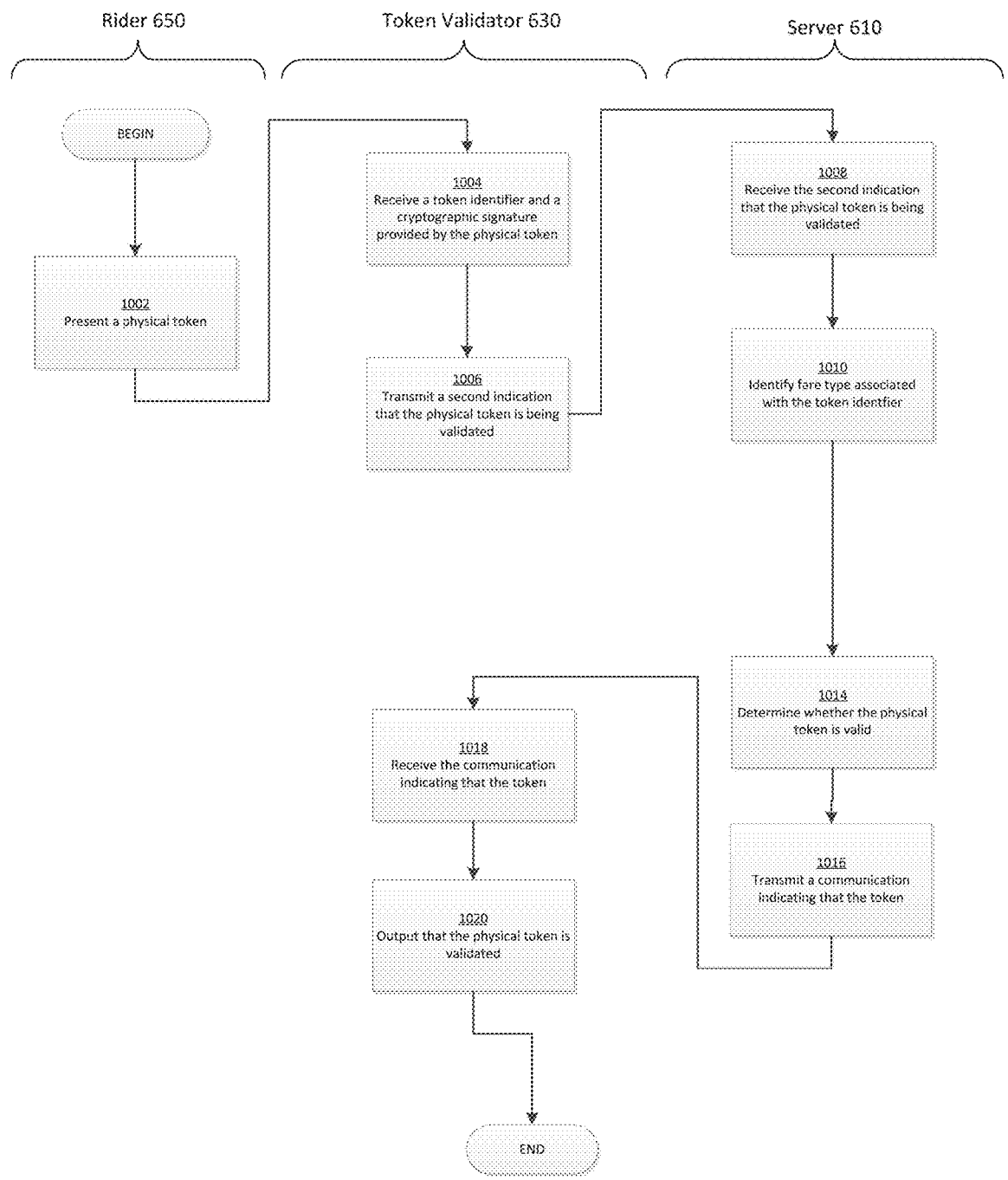
FIG. 10 illustrates a process for validating physical token presented at a token validator in accordance with the disclosed embodiments.

FIGS. 9-10 illustrate processes for facilitating use of physical tokens in a transit system. In particular, FIG. 9 illustrates a process 900 for creating, activating, and dispensing a physical token 625 in accordance with the disclosed embodiments.

At a step 902, server 610 may generate a token identifier 612. A token identifier 612 may be any data that can be used to uniquely identify a physical token in circulation.

At a step 904, server 610 may generate, using a private key associated with server 610, a cryptographic signature 614 based on the token identifier 612.

At a step 906, server 610 may transmit the token identifier 612 and the cryptographic signature 614 to a token dispenser 620. In some embodiments, server 610 may generate and transmit a plurality of token identifiers and associated cryptographic signatures in batch.

At a step 908, token dispenser 620 may receive the token identifier 612 and the cryptographic signature 614. In some embodiments, token dispenser 620 may include a token activator 822 and a physical token creator 824, and the token identifier 612 and the cryptographic signature 614 may be received at token creator 824.

At a step 910, token dispenser 620 may receive a selection of a fare type 622 from a rider 650. In some embodiments, token dispenser 620 may include a user interface that lists fare types that are available to select, and rider 650 may use the user interface to provide the selection of the fare type 622. In embodiments where token dispenser 620 includes token activator 822, the selection of the fare type 622 may be received at token activator 822.

At a step 912, token dispenser 620 may create a physical token 625. In embodiments where token dispenser 620 includes physical token creator 824, physical token 625 may be created by physical token 625. Physical token 625 may be configured to provide token identifier 612 and cryptographic signature 614 in a manner that can be received by a token validator 630. In some embodiments, physical token 625 may be a paper-based token including a barcode (e.g., QR code, AZTEC). The barcode may be encoded with token identifier 612 and cryptographic signature 614. In some embodiments, physical token 625 may include an RFID-based token including an RFID configured to (or programmed to) transmit token identifier 612 and cryptographic signature 614 to a compatible RFID reader on token validator 630. In some embodiments, token dispenser 620 or token creator 824 may create a plurality of physical tokens in batch.

At a step 914, token dispenser 620 may dispense physical token 625. For example, token dispenser 620 may dispense physical token 625 into a tray that can be accessed by a rider 650. In embodiments where token dispenser 620 includes token activator 822, physical token 625 may be dispensed by token activator 822. Step 914 may be performed any time after steps 918 and 912.

At a step 916, token dispenser 620 may generate dispenser context data 624. In some embodiments, dispenser context data 624 may include a location of token dispenser 620, token activator 822, and/or transit station/platform where token dispenser 620 is placed. In some embodiments, dispenser context data 624 may include a time/date at which physical token 625 is dispensed. In some embodiments, dispenser context data 624 may include a type (e.g., paper-based, RFID-based) of physical token 625. In embodiments where token dispenser 620 includes token activator 822, dispenser context data 624 may be generated by token activator 822.

At a step 918, token dispenser 620 may transmit (i) a first indication that the physical token 625 is dispensed, (ii) selection of a fare type 622 (e.g., selected by a rider 650), and (iii) dispenser context data 624. In some embodiments, token dispenser 620 may further transmit token identifier 612 and/or cryptographic signature 614. For example, token dispenser 620 may transmit token identifier 612 and/or cryptographic signature 614 of a pre-created physical token 625 that is selected to be dispensed. In embodiments where token dispenser 620 includes token activator 822, (i) the first indication that the physical token 625 is dispensed, (ii) the selection of a fare type 622, and (iii) the dispenser context data 624 may be transmitted by token activator 822. As shown in FIG. 9, server 610 may perform steps 916 and/or 918 before, during, and/or after step 912.

At a step 920, server 610 may receive (i) the first indication that the physical token 625 is dispensed, (ii) the selection of a fare type 622, and (iii) the dispenser context data 624 including a dispense location. In some embodiments, server 610 may further receive token identifier 612 and/or cryptographic signature 614.

At a step 922, server 610 may associate token identifier 612 with the selected fare type 622 and the dispenser context data 624. In some embodiments, server 610 may record (e.g., in token records 652) that token identifier 612 is activated and/or associated with the selected fare type 622 and the dispenser context data 624. Steps 920 and 922 may be performed any time after step 918.

FIG. 10 illustrates a process 1000 for validating physical token 625 presented at a token validator 630 in accordance with the disclosed embodiments.

At a step 1002, rider 650 may present physical token 625 to a token validator 630. Token validator 630 may be located, for example, at an entrance or an exit of a transit station (e.g., an airport, a train/subway station, a bus station for one or more buses), a transit platform (e.g., an airport gate, train/subway platform, a bus stop within a bus station), or a transit vehicle (e.g., train/subway, bus, taxi, ride-share vehicle, airplane). In some embodiments, token validator 630 may be a portable device that can be carried by, for example, an employee of the transit system.

At a step 1004, token validator 630 may receive token identifier 612 and cryptographic signature 614 provided by the presented physical token 625. For example, token validator 630 may use a camera to capture a barcode on physical token 625 that is encoded with token identifier 612 and cryptographic signature 614. In another example, token validator 630 may use an RFID reader to capture a signal transmitted by physical token 625 that is encoded with token identifier 612 and cryptographic signature 614.

At a step 1006, token validator 630 may transmit a second indication that the physical token 625 is being validated. The second indication (i) is transmitted after the token validator 630 verifies the cryptographic signature 614 using a public key associated with server 610, and (ii) includes the token identifier 612 and validator context data 632 including a validation location. In some embodiments, validator context data 632 may include a location of token validator 630. In some embodiments, validator context data 632 may include a time/date at which physical token 625 is presented to token validator 630. In some embodiments, validator context data 632 may include a type of physical token 625 (e.g., paper based, RFID-based) that was presented.

At a step 1008, server 610 may receive the second indication that the physical token 625 is being validated.

At a step 1010, server 610 may identify the fare type 622 associated with the token identifier 612. For example, server 610 may access records (e.g., token records 652) created at step 922 to identify the associated fare type 622. As discussed above, a set of restrictions may be associated with the fare type 622 and govern use of physical token 625. For example, a fare type may be associated with a set of restrictions identifying at least one of: whether a travel route can include a transfer, a maximum distance of the travel route, an allowed direction of the travel route, a transit station where the physical token can be used, and a time at which the physical token can be used.

At a step 1014, server 610 may determine whether the physical token 625 is valid based on (i) the set of restrictions associated with the fare type 622, (ii) the validator context data 632, and (iii) the dispenser context data 624.

In some embodiments, server 610 may determine, based on the validator context data 632 and/or the dispenser context data 624, whether the use of physical token 625 at token validator 630 complies with the set of restrictions. For example, physical token 625 may be associated with a route-specific fare type 622. Thus, server 610 may determine whether the location of token validator 630 included in validator context data 632 is a transit station appropriate for the route. In another example, physical token 625 may be associated with a fare type 622 that can only be used for one hour immediately after the token is dispensed. Thus, server 610 may determine whether the dispense time included in dispenser context data 624 is within one hour of the current time.

In some embodiments, server 610 may store records pertaining to prior validations. For example, server 610 may store records of token identifiers that have been validated by server 610, including the time and date of validation, the received validator context data 632, and validation results.

In these embodiments, server 610 may determine whether physical token 625 associated with token identifier 612 is valid further based on these records. For example, physical token 625 may be of a single-use fare type 622 that can only be used once to enter a transit station. Thus, server 610 may determine, based on the records pertaining to prior validations, whether physical token 625 has been successfully validated previously. In another example, physical token 625 may be of a fare type 622 that cannot be used for a transfer. Thus, server 610 may determine, based on the records pertaining to prior validations and/or various data included in dispenser context data 624 and validator context data 632, whether physical token 625 is being used for a transfer. In yet another example, physical token 625 may be of a fare type 622 that can only be used for south-bound travels. Here, server 610 may first determine the location of the initial transit station, for example, by accessing records pertaining to prior validations and identifying the last successful validation of physical token 625. Further, server 610 may determine whether the location of token validator 630 included in validator context data 632 is south of the identified initial transit station.

At an optional step, token validator 630 may determine whether physical token 625 is valid. In some embodiments, token validator 630 may validate physical token 625 after determining that server 610 is unavailable. In some embodiments, token validator 630 may validate physical token 625 even when server 610 is available. Token validator 630 may validate physical token 625 based on information provided by physical token 625, such as, but not limited to, data indicative of the associated fare type 622, at least a subset of the restrictions governing the use of physical token 625 (e.g., expiration date, permitted travel direction, permitted transit stations/platforms for entry/exit, permitted routes), and/or at least a portion of dispenser context data 624 (e.g., dispense location/time, dispenser identifier). For example, physical token 625 may be configured to provide an expiration time and/or the fare type of physical token 625, and token validator 630 may be configured to validate physical token 625 by determining whether the physical token 625 has expired based on the expiration time and/or whether the fare type can be used at the particular token validator 630 based on the fare type. In another example, token validator 630 may determine whether physical token 625 was previously validated by the token validator 630 or a different token validator in the last two hours.

At a step 1016, server 610 may transmit a communication indicating that the physical token 625 is valid. In some embodiments, the communication may include data indicative of whether physical token 625 is valid or not.

At a step 1018, token validator 630 may receive the communication indicating that the physical token 625 is valid.

At another optional step token validator 630 and/or server 610 may determine whether physical token 625 is being used fraudulently. For example, token validator 630 and/or server 610 may determine a rate of travel between the dispense location and the validation location based on the dispense time and the validation time, and compare the determine rate of travel to a threshold value. The threshold value may be determined based on historical values and/or based on theoretical values, and if the determined rate exceeds the threshold value, server 610 may determine that physical token 625 is being used fraudulently.

At a step 1020, token validator 630 may output that physical token 625 is validated. In some embodiments, token validator 630 may output that physical token 625 is validated after token validator 630 receives the communication from server 610 at step 1018 and after token validator 630 validates physical token 625. In some embodiments, if server 610 is unavailable, token validator 630 may output that physical token 625 is validated after token validator 630 validates physical token 625.

In some embodiments, output may include instructions for an access control device 140, and access control device 140 may generate an output based on the instruction provided by token validator 630. The generated output may be indicative of whether rider 650 is permitted or denied from proceeding beyond the location of access control device 140. For example, access control device 140 may be a gate or a door. The gate or door may be electronically controlled such that the gate or door is locked when rider 650 is denied from proceeding and unlocked/turned when rider 650 is permitted to proceed. Additionally, or alternatively, access control device 140 may include a speaker that produces a sound, and the produced sound may be indicative of whether rider 650 is permitted or denied from proceeding. In some embodiments, access control device 140 may include a display monitor that displays a visual content indicative of whether rider 650 is permitted or denied from proceeding. In some embodiments, access control device 140 may include one or more light emitting devices, and access control device 140 may turn on or off one or more light emitting devices to indicate whether rider 650 is permitted or denied form proceeding.

Audio-Based Communications for Digital Ticket/Token Systems

Figure 11:
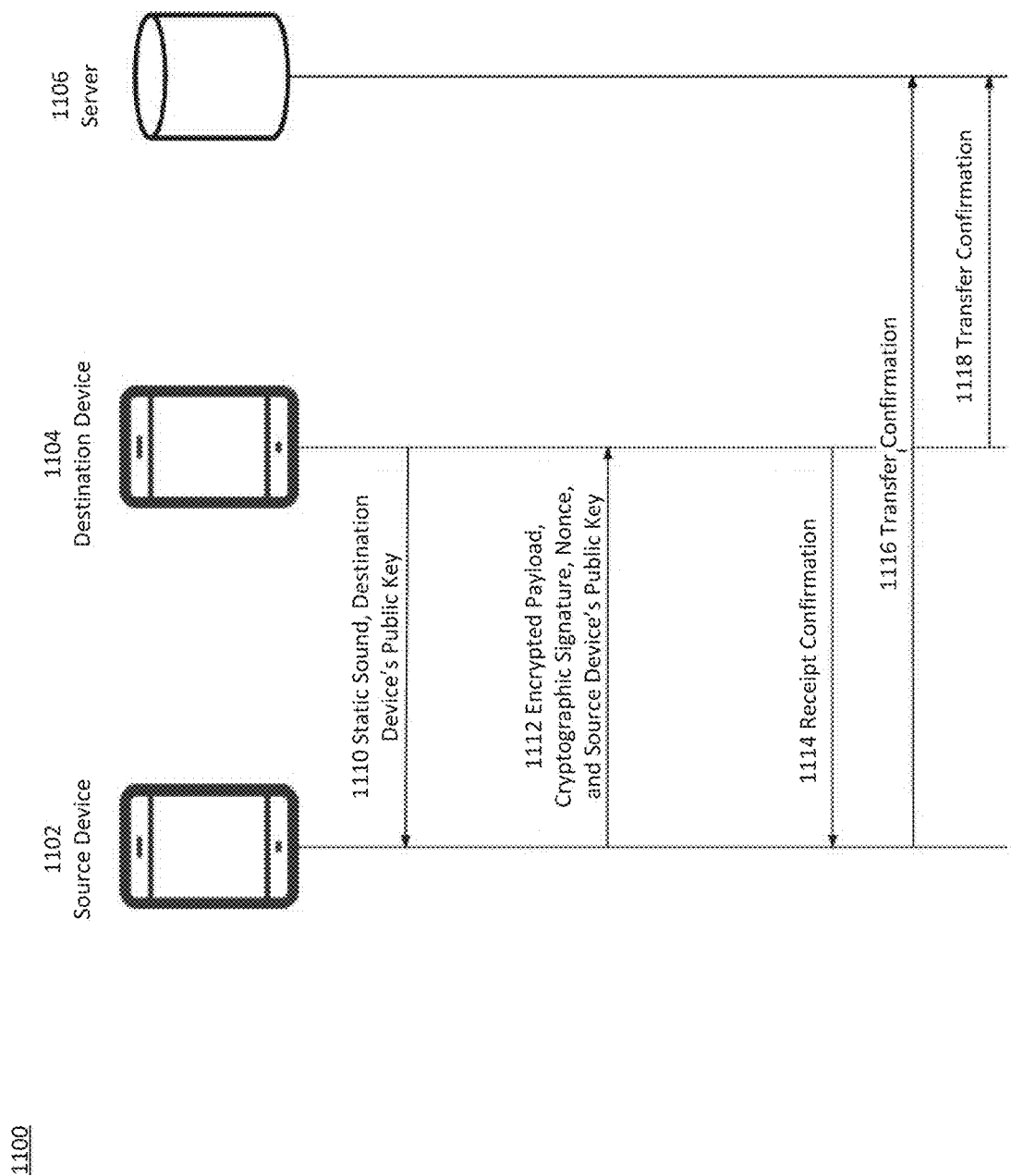
FIG. 11 illustrates an example of a system for using audio-based communications to transfer a digital ticket and/or a digital token between devices in accordance with the disclosed embodiments.

FIG. 11 illustrates an example of a system 1100 for using an audio-based communications technique to transfer a digital ticket and/or a digital token between devices in accordance with the disclosed embodiments.

In one example, system 1100 may be capable of transferring a digital ticket purchased by a ticket holder and stored on ticket holder's device 110 to another device. In another example, system 1100 may be capable of transferring information needed (e.g., token identifier 612, fare type 622, dispenser context data 624, a digital ticket, a ticket-server signature, and/or a device signature) to validate a digital ticket or a digital token to a validator (e.g., ticket validator 120 or token validator 630). In yet another example, system 1100 may be capable of transferring information needed (e.g., token identifier 612 and/or cryptographic signature 614) to create, activate, and dispense a ticket or a token to a dispenser (e.g., token dispenser 620). Furthermore, system 1100 may be capable of providing real-time transit information and/or advertisements to a device operated by a rider using the audio-based communication techniques described herein.

In FIG. 11, system 1100 includes a source device 1102 having access to a payload (e.g., digital tickets/tokens, cryptographic signatures, and/or ticket/token validation information) and a destination device 1104 that would receive the payload. Source device 1102 or destination device 1104 may be, for example, ticket-holder's device 110, ticket validator 120, token dispenser 620, or token validator 630. As shown in FIG. 11, system 1100 may further include a server 1106. In some embodiments, server 1106 may implement at least some functions of ticket server 130 and/or token server 610. In some embodiments, server 1106 be in communication with ticket server 130 and/or token server 610. In some embodiments, server 1106 may be capable of modifying status of a digital ticket or token. For example, server 1106 may be authorized to, and capable of, changing a user account or a user device associated with a ticket/token. In another example, server 1104 may be authorized to, and capable of, recording that a digital ticket/token is used or available for use.

In system 1100, source device 1102 and destination 1104 may each include a digital to analog converter (DAC), an analog to digital converter (ADC), a speaker, and a microphone. In some embodiments, the speaker and/or the microphone may be capable of outputting and receiving sounds in the frequency range of 200 Hz and 18 kHz, respectfully.

At an operation 1110, destination device 1104 may output, using a speaker and a DAC of destination device 1104, sound (e.g., static sound) having a predetermined set of frequency components at predetermined amplitudes. The sound indicates to a recipient of the sound that destination device 104 is ready to receive a payload. Destination device 1104 may further output sound encoded with destination device 1104's public key. Alternatively, the sound may be encoded with destination device 1104's public key. In some embodiments, destination device 1104 may output the sound in response to a user input. In some embodiments, destination device 1104 may output the sound in response to a communication from source device 1102.

Subsequently, source device 1102 may receive, using a microphone of source device 1102, the static sound and/or the sound encoded with destination device 1104's public key. Source device 1102 may use an ADC to obtain the destination device 1104's public key. Further, source device 1102 may use destination device 1104's public key to generate a shared secret key and encrypt the payload with the shared secret key. The encryption process also generates an authentication hash.

At an operation 1112, source device 1102 may transmit, using a speaker and a DAC of source device 1102, sound encoded with the encrypted payload, the authentication hash, a nonce generated by source device 1102, and source device 1102's public key. In some embodiments, source device 1102 may transmit the encrypted payload, the authentication hash, a nonce generated by source device 1102, and source device 1102's public key after receiving an input from a user of source device 1102.

In some embodiments, prior to transmission of the payload, source device 1102 may verify that the payload includes a type of data authorized to be transferred to another device. For example, in some embodiments, only the single-use tokens may be authorized to be transferred to another device. Thus, in these embodiments, token that are not single-use token may be prevented from being transmitted by source device 1102. In another example, in some embodiments, only tickets/tokens that have not been used previously may be authorized to be transferred to another device. Thus, in these embodiments, tickets/tokens that have already been used may be prevented from being transmitted by source device 1102. In some embodiments, riders may be prevented from transferring a ticket/token during a transfer. In yet another example, tickets/tokens that have been used to enter, but not exit from, a vehicle/station/platform may be prevented from being transmitted by source device 1102. This may prevent a rider from transferring a ticket/token in the middle of a travel and thus not being able to exit the vehicle/station/platform he or she is currently on/in.

Subsequently, destination device 1104 may receive, using a microphone of destination device 1104, sound encoded with the encrypted payload (e.g., digital ticket and/or digital token), the authentication hash, the nonce, and source device 1102's public key. Destination device 1104 may use the ADC to obtain the encrypted payload, the authentication hash, a nonce generated by source device 1102. Destination device 1104 may generate the shared secret key using source device 1102's public key and decrypt the encrypted payload using the shared secret key and store the decrypted payload.

A shared secret may be derived by combining a public key of a first entity and the private key of a second entity, and the private key of the first entity and the public key of the second entity. They may be used, for example, to encrypt and decrypt a payload using an Elliptic Curve Diffie Hellman (ECDH) algorithm. The nonce may be used to generate an ephemeral session id that prevents replay attacks with previous sound recordings.

At an operation 1114, destination device 1104 may output, using a speaker and a DAC, sound indicative of a confirmation that destination device 1104 has successfully decrypted the payload. In some embodiments, destination device 1104 may decrypt the payload and/or output the sound indicative of the confirmation destination device 1104 after receiving an input from a user of destination device 1104 to accept the payload.

At an operation 1116, source device 1102 may transmit a first communication to server 1106 indicating successful transfer of the payload. In particular, source device 1102 may communicate with server 1106 that a particular ticket/token has been transferred to another device and/or another user. In some embodiments, source device 1102 may remove at least some of the payload from source device 1102. Alternatively, or additionally, source device 1102 may prevent the transferred payload from being used by source device 1102.

At an operation 1118 destination device 1104 may transmit a second communication to server 1106 indicating successful receipt of the payload. In particular, destination device 1102 may communicate with server 1106 that a particular ticket/token has been successfully received.

Server 1106, in response to receiving both the first and second communications, may update records to reflect that the token/ticket is now in destination device 1104 and not source device 1102. Alternatively, server 1106, in response to receiving the second communications, may update records to reflect that the token/ticket is now in destination device 1104 and not source device 1102. In some embodiments, server 1106 may communicate with ticket server 130 and/or token server 610 to update records associated with the transferred ticket/token. For example, server 1106 may record that a ticket/token is now on another device. In some embodiments, server 1106 may communicate with ticket server 130 and/or token server 610 to prevent source device 1102 from using the transferred ticket/token and/or allowing destination device 1104 to use the transferred ticket/token. In some embodiments, source device 1102 and/or destination device 1104 may update records to reflect that the token/ticket is now in destination device 1104 and not source device 1102 (e.g., when server 1106 is not available).

Remote Device Management

Figure 12:
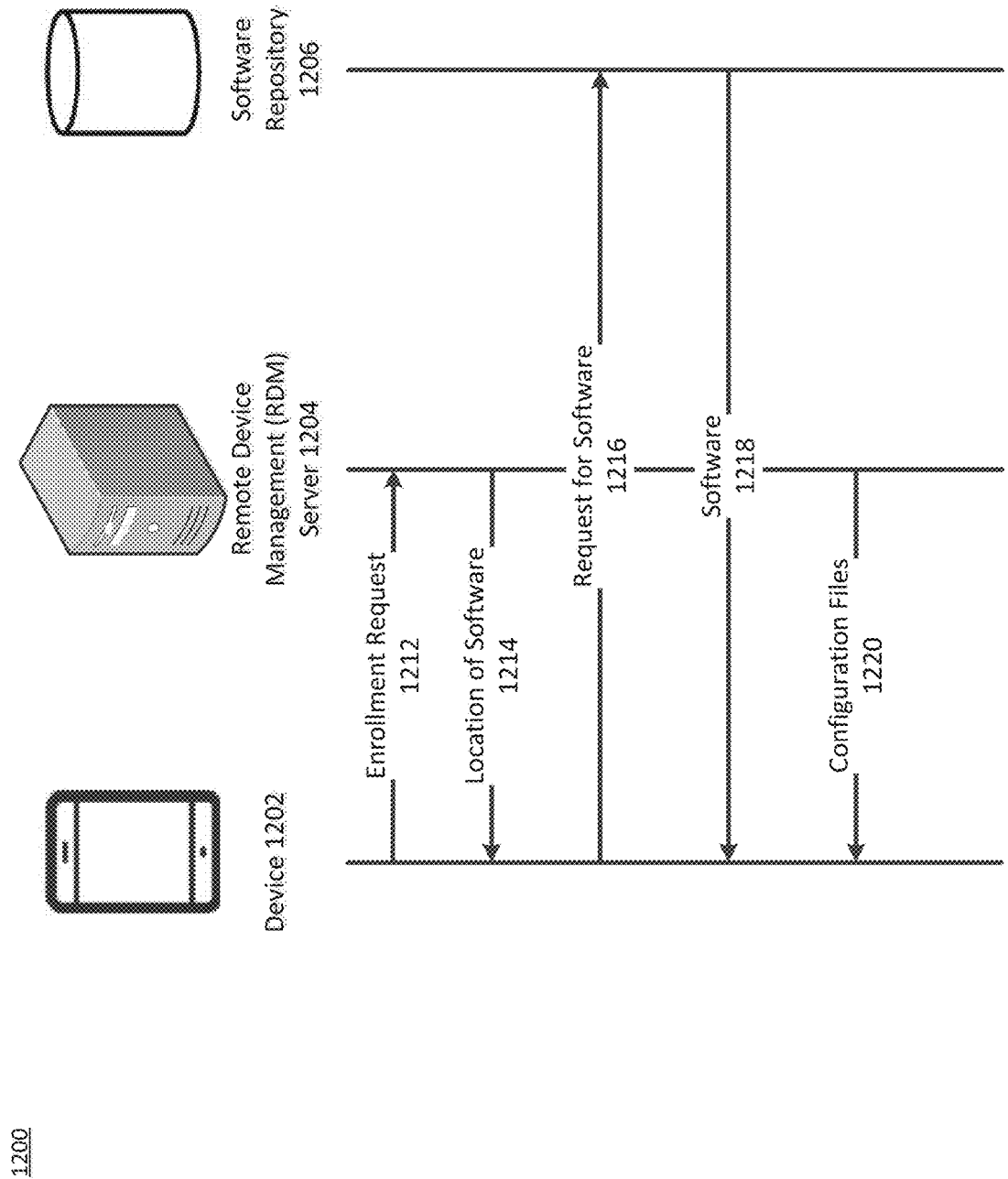
FIG. 12 illustrates an example of a system for remotely managing various devices of a digital ticket/token system in accordance with the disclosed embodiments.

FIG. 12 illustrates an example of a system 1200 for remotely managing various devices of a digital ticket/token system in accordance with the disclosed embodiments. In particular, system 1200 may be capable of providing new/updated software and/or configuration data for the software to various devices (e.g., ticket validator 130, token validator 630, token dispenser 620, access control device 140, ticket server 130, and/or token server 630). As shown in FIG. 12, system 1200 includes a new device 1202, a remote device management (RDM) server 1204, and a software repository 1206.

At an operation 1212, device 1202 may transmit an enrollment request. The enrollment request indicates to RDM server 1204 that device 1202 is requesting to be managed by RDM server 1204. The enrollment request may include various data that describes and/or identifies device 1202. In some embodiments, an enrollment request may include a device identifier that RDM server 1204 can use to obtain information about device 1202. For example, an enrollment request may include a serial and/or model number of device 1202 that can be used to query the information about device 1202. Alternatively, or additionally, the enrollment request may include the information about device 1202. For example, the enrollment request may identify capabilities of device 1202. In some embodiments, information about device 1202 may include a user-configured designation associated with device 1202. In some embodiments, devices assigned the same designation may execute a common software program (e.g., firmware).

At an operation 1214, RDM server 1204 transmit a location of a software program. In some embodiments, RDM 1204 select the software program from a list of available software programs based on the designation associated with device 1202. For example, in scenarios where device 1202 is a token validator 630 and assigned to a "token validators" designation, RDM server 1204 may transmit a URL and/or a secret code to retrieve a software program designed for "token validators" designation. The software program may be programmed to execute on token validator 630. In the example of FIG. 12, the URL may identify a software program stored on software repository 1206. Subsequently, in some embodiments, RDM server 1204 may provide a location of an updated/new software program.

At an operation 1216, device 1202 may request the software program from the location provided at operation 1214. In some embodiments, device 1202 may request the software program using the URL and/or the secret code provided at operation 1214. The software program may be associated with the designation associated with device 1202. In some embodiments, the software program may be associated with a plurality of designations.

At an operation 1216, software repository 1206 may provide the requested software to device 1202. In response, device 1202 may execute the provided software. The provided software may implement, for example, functionalities of one or more devices in a digital ticket/token system.

At an operation 1220, device 1202 (or the software provided at operation 1216) may receive configuration data from RDM server 1204. The configuration data may be any data that affects operations of the software program executing on device 1202. In some embodiments, the configuration data may be pushed by RDM server 1204. In some embodiments, the configuration data may be requested by device 1202 and provided to device 1202 in response to the request.

In some embodiments, the configuration data may include one or more cryptographic keys/certificates used by device 1202. In some embodiments, the configuration data may include one or more list of entities (e.g., IP addresses of servers) that device 1202 is authorized to communicate with.

In embodiments where device 1202 is a ticket validator 130 or token validator 630, the configuration data may include one or more rules (and/or parameters for the rules) for determining whether a ticket/token is valid.

In some embodiments, the configuration data may include criteria for determining that a server is considered unavailable to device 1202. For example, the configuration data may define a number of times device 1202 must attempt to contact a server before determining that the server is offline and subsequently operate in an offline-mode.

In embodiments where device 1202 is a token dispenser 630, the configuration data may include, for example, fare types that may be available to dispense at token dispenser 630. The configuration data may also include ticket catalog information, such as prices and routes, as well as availability and definition of specialized tickets. The configuration data may also include software that can be executed on token dispenser 630.

In embodiments where device 1202 is a ticket server 110 or a token server 610, the configuration data may define rules and/or parameters for validating tokens/tickets transmitted by a validator. The configuration data may include ticket catalog information, such as prices and routes, as well as availability and definition of specialized tickets. The configuration data may further include software that can be executed on ticket server 110 or token server 610. Further, the configuration data may include cryptographic keys.

In some embodiments, the configuration data may include rules for assigning priority to communications. For example, the configuration data may include a rule that assigns the highest priority to communications (e.g., validation requests) from validators in a busy transit station and the lower priority to communications from validators in a rural-area transit station. In this example, validators may process the communications with the highest priority first.

In some embodiments, in addition to, or alternative to, the configuration data, device 1202 (or the software provided at operation 1216) may receive another software program from RDM server 1204, and in response, execute the received software program. In some embodiments, in addition to, or alternative to, the configuration data, device 1202 (or the software provided at operation 1216) may receive a software program that executes with in the software program provided at operation 1214.

Figure 13:
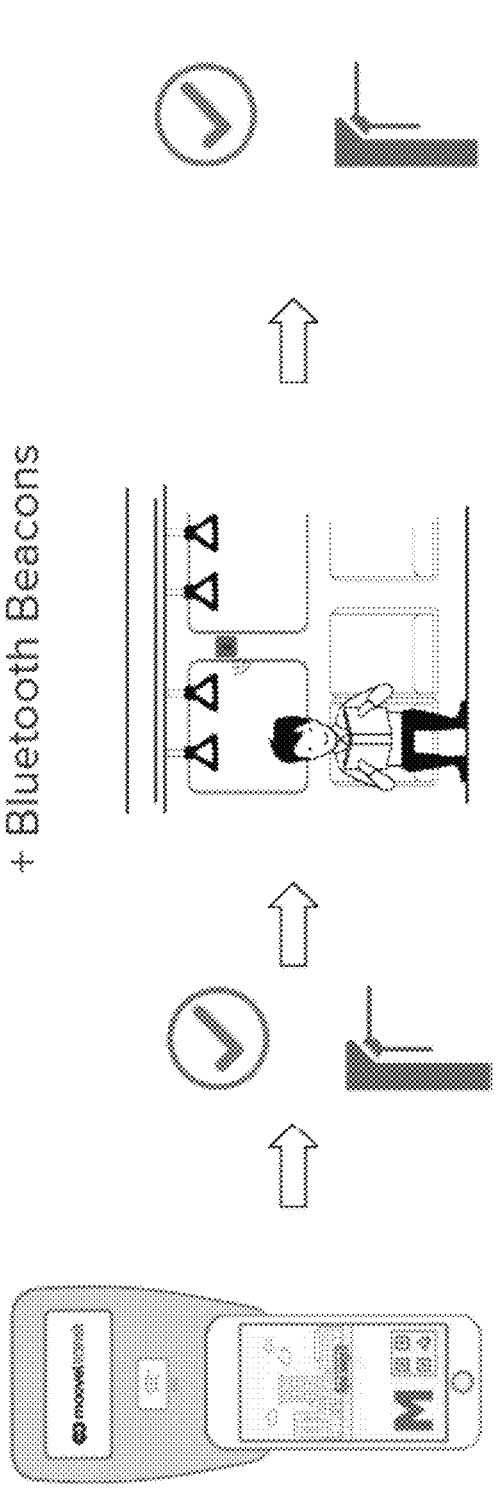
FIG. 13 illustrates another example of a digital ticket/token system that includes a mobile device, a gate/door validator, and a beacon in accordance with the disclosed embodiments.

FIG. 13 illustrates another example of a digital ticket/token system that includes a mobile device, a gate/door validator, and a beacon. The gate/door validator is similar to the ticket/token validators discussed above and may be configured to control a gate/door (e.g., an access control device discussed above). For example, the gate/door validator may be configured to open the gate/door when the ticket/token is valid. In some embodiments, the gate/door validator may be attached to the gate/door, inside the gate/door, or proximate to the gate/door (e.g., in a path from a train/bus to the gate/door).

In some embodiments, the gate/door validator may scan a ticket on a mobile device using an NFC module or a bar code scanner, allowing rapid validation of mobile tickets and supporting a wide range of mobile devices that may have different capabilities.

In some embodiments, a beacon (e.g., a Bluetooth beacon) may be placed at various locations (e.g., inside a train, inside a bus, train platforms, bus stops) to detect when the mobile device is entering or leaving a certain area. In some embodiments, a beacon may be placed near a gate/door or on a path to a gate/door. The mobile device that is near such a beacon may alert the rider if a ticket needs to be purchased or a stored value needs to be recharged before they encounter a gate/door.

In some embodiments, a beacon may work with NFC or barcodes to alert the rider if a ticket needs to be purchased or a stored value needs to be recharged before they encounter a gate/door or board a vehicle.

Bluetooth low energy (BLE) beacons are inexpensive devices that require little power or connectivity. BLE beacons emit an identification signal which interacts with the RiderApp, providing instant locational awareness. BLE beacons may be used for tracking location of customers, location-based coupons, marketing partnerships, push notifications, security enhancements. In one exemplary marketing project, incentives and bonuses may be offered to customers when they visit partner's establishments.

Figure 14:
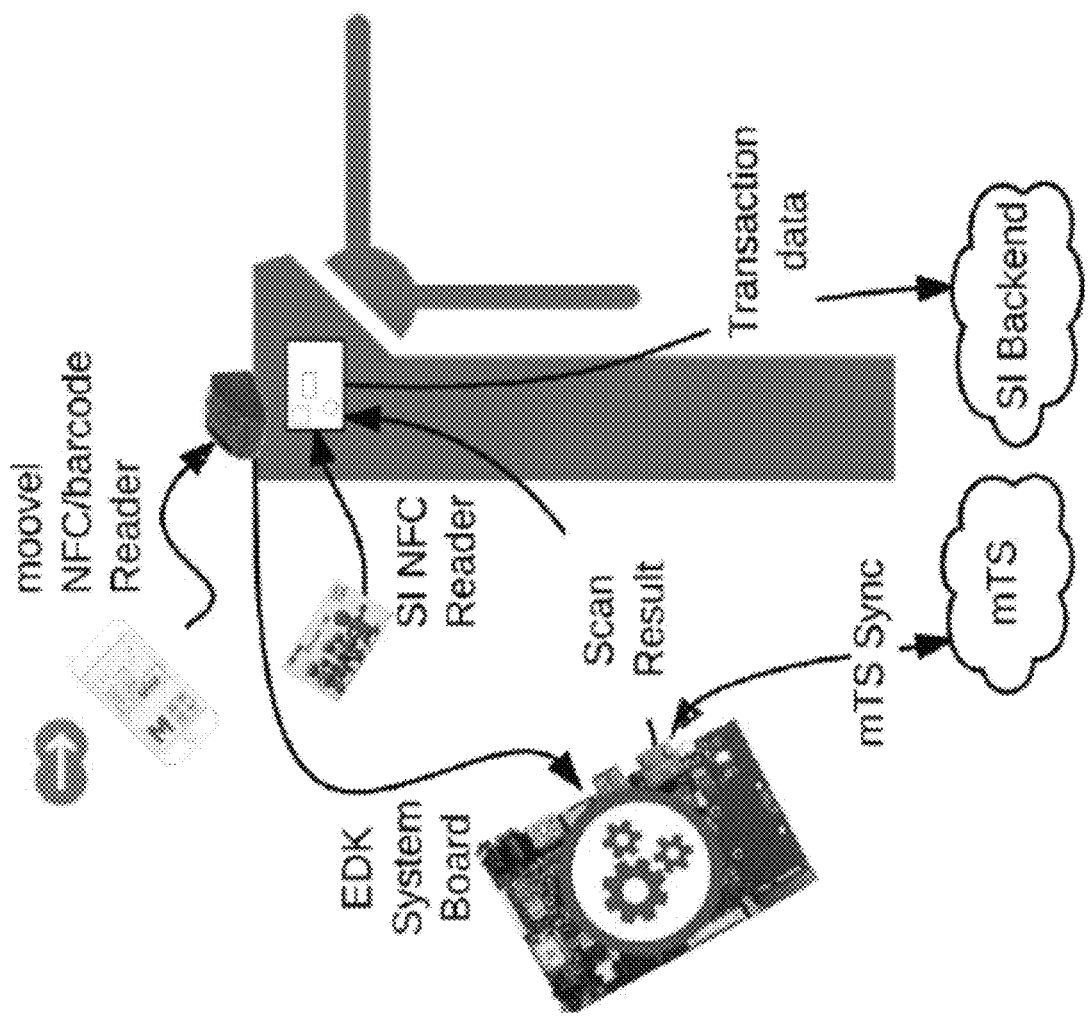
FIG. 14 illustrates a gate/door validator of FIG. 13.
Figure 15:
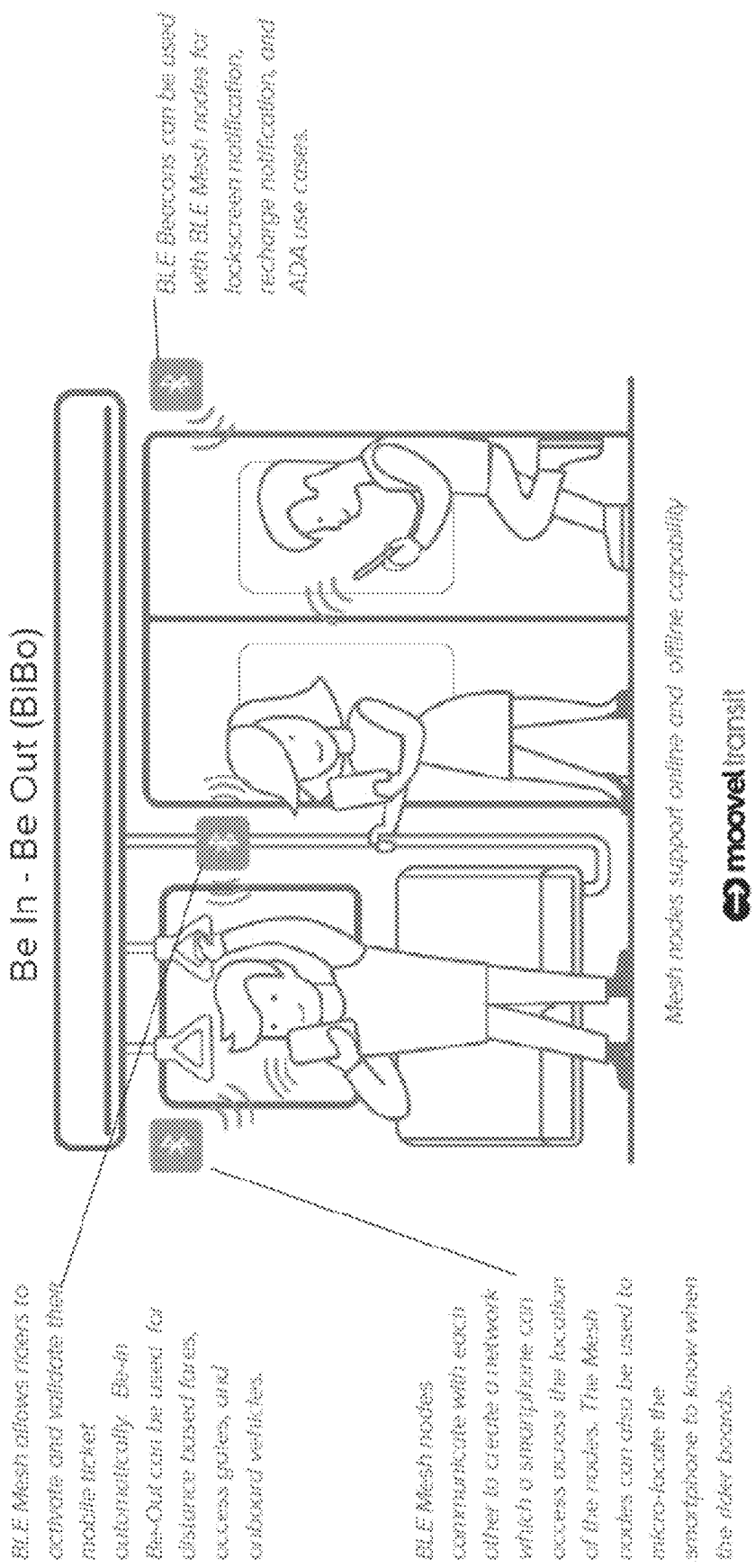
FIG. 15 illustrates an example of a Be-in Be-out digital ticket/token system that includes mobile devices and BLE meshes in accordance with the disclosed embodiments.

FIG. 14 illustrates a gate/door validator of FIG. 13. For fast implementations with existing gate hardware, the gate/door validator includes an EDK system board that provides the optimum integration options. The EDK system board can be integrated with the existing gate system board via a serial interface to provide mobile ticket validation results, or the (general-purpose input/output) GPIO on the board can be used to directly trigger the gate. The EDK system board may provide validation results to the transit system through an Ethernet connection. Barcode, NFC, and BLE beacons use cases may be supported and the gate/door validator be mounted inside the gate or on top FIG. 15 illustrates an example of a Be-in Be-out digital ticket/token system that includes mobile devices and BLE meshes. In the example of FIG. 15, BLE mesh allows riders to activate and validate their digital tickets/tokens automatically. Be-in Be-Out can be used for distance based fares, access gates, and onboard vehicles. Further, BLE mesh nodes may communicate with each other to create a network which a smartphone can access across the location of the nodes. The mesh nodes can also be used to micro-locate the smartphone to know when the rider boards. BLE beacons can be used with BLE mesh nodes for lock screen notification, recharge notification, and ADA use cases.

The disclosed mobile ticket/token systems of FIGS. 13-15 provide a number of benefits, including for example:

Hardware-Agnostic Validation Platform

The disclosed mobile ticket/token systems include products that support a wide-range of third-party hardware for vehicles, gates, and platforms. Further, the disclosed systems can be integrated with other vehicle systems like computer-aided dispatch (CAD) and automated vehicle location (AVL) systems, and automated passenger counter (APC) systems.

Wide-Range of Support for Contactless Technologies

The disclosed mobile ticket/token systems support advanced barcodes with secure QR code and Aztec barcodes, in-depth fraud prevention technique, and very fast read times. The disclosed systems also leverage NFC solutions with support for industry leading mobile platforms to enable the widest range of users. In addition, the disclosed systems implement new approaches using Bluetooth low-energy (BLE) beacons, mesh networking techniques, and micro-location techniques.

Online and Offline Validation

The disclosed systems support offline ticket validation for fast on-board validation with synching to backend. Furthermore, the disclosed systems also provide online validations for gate access or where a hard-line is available.

Extend Current Open Service APIs

The disclosed mobile ticket/token validation systems may support embedded application programming interfaces (APIs) that allow third-parties to integrate their validation logic with the mobile ticket/token solution.

The disclosed mobile ticket/token validation systems may define a barcode or NFC ticket specification that may be shared with a third-party. The third-party may use the specification to decode the mobile ticket and to provide additional functionalities to the riders and/or the agencies.

Turn-Key Validation Solutions

The disclosed mobile ticket/token validation systems may provide a range of hardware and software configurations. For example, the systems may include products for on-board validation and parking. In another example, the solutions may be used to control platform/gate access.

Embedded Development Kit (EDK)

The disclosed mobile ticket/token validation systems may include an EDK for mobile ticket/token validation that can be easily integrated with existing and new fare collection and validation devices. Further, the EDK may provide simple RESTful API that allows third-party hardware providers to easily integrate the disclosed on-board validator service into their hardware, enabling fast integration with the disclosed mobile ticket/token systems.

Single Board Validators

The disclosed mobile ticket/token validation systems may be implemented on a standard single-board computer with a serial protocol interface and GPIO to support fast integrations into existing gates and fare boxes.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

We claim:

1. A server for facilitating use of physical tokens in a transit system, comprising:
one or more processors configured to:
  generate a token identifier;
  generate, using a private key associated with the server, a cryptographic signature that is generated based on the token identifier;
  transmit the token identifier and the cryptographic signature to a token dispenser, wherein:
    the token dispenser is configured, upon having a payment processed that is for the value of transit to be associated with the token, to physically dispense a physical token, and
    the physical token is encoded with the token identifier and the cryptographic signature;
  receive, from the token dispenser, (i) a first indication that the physical token is dispensed, (ii) selection of a fare type, and (iii) dispenser context data including a dispense location;
  associate the token identifier with the selected fare type and the dispenser context data;
  receive, a token validator, a second indication that a dispensed physical token is being validated, wherein the second indication:
    (i) is transmitted after the token validator verifies the cryptographic signature encoded in the physical token using a public key associated with the server, and
    (ii) includes the token identifier encoded in the physical token and validator context data including a validation location;
  identify the fare type associated with the token identifier;

determine whether the physical token is valid based on (i) a set of restrictions associated with the fare type, (ii) the validator context data associated with the token identifier encoded in the physical token, and (iii) the dispenser context data received from the token validator; and transmit a communication to the ticket validator indicating whether the physical token is valid, wherein the ticket validator, in response to receiving the communication, outputs an indicator whether the physical token is valid.

2. The server of claim 1, wherein the physical token includes a transmitter configured to transmit the token identifier to the token validator, and wherein the transmitter is an active transmitter or a passive transmitter.

3. The server of claim 1, wherein the token dispenser includes a payment system for accepting a payment from a customer for the selected fare type, and a physical-token creator configured to create the physical token.

4. The server of claim 1, wherein the set of restrictions identifies at least one of:
   whether a travel route can include a transfer;
   a maximum distance of the travel route;
   an allowed direction of the travel route;
   a transit station where the physical token can be used; and
   a time at which the physical token can be used.

5. The server of claim 1, wherein the dispenser context data further includes a dispense time and the validator context includes a validation time, and wherein the determination of whether the physical token is valid includes determining a rate of travel between the dispense location and the validation location based on the dispense time and the validation time, and comparing the rate of travel to a threshold value.

6. The server of claim 1, wherein the validator context includes a validation time and wherein the determination of whether the physical token is valid includes determining a time duration between the validation time and a time at which the physical token was previously validated by the token validator or a different token validator, and determining whether the determined time duration exceeds a threshold time duration.

7. The server of claim 1, wherein the physical token is further encoded with an expiration time and/or the fare type, and wherein the token validator, when the server is unavailable or otherwise unreachable, is configured to validate the physical token based on the expiration time and the fare type.

8. A method for facilitating use of physical tokens by a server, the method comprising:
   generating a token identifier;
   generating, using a private key associated with the server, a cryptographic signature that is generated based on the token identifier;
   transmitting the token identifier and the cryptographic signature to a token dispenser, wherein:
      the token dispenser is configured, upon having a payment processed that is for the value of transit to be associated with the token, to physically dispense a physical token, and
      the physical token is encoded with the token identifier and the cryptographic signature;
   receiving, from the token dispenser, (i) a first indication that the physical token is dispensed, (ii) selection of a fare type, and (iii) dispenser context data including a dispense location;
   associating the token identifier with the selected fare type and the dispenser context data;
   receiving, from the token validator, a second indication that a dispensed physical token is being validated, wherein the second indication:
      (i) is transmitted after the token validator verifies the cryptographic signature encoded in the physical token using a public key associated with the server, and
      (ii) includes the token identifier encoded in the physical token and validator context data including a validation location;
   identifying the fare type associated with the token identifier;
   determining whether the physical token is valid based on (i) a set of restrictions associated with the fare type, (ii) the validator context data associated with the token identifier encoded in the physical token, and (iii) the dispenser context data received from the token validator; and
   transmitting a communication to the ticket validator indicating whether the physical token is valid, wherein the ticket validator, in response to receiving the communication, outputs an indicator whether the physical token is valid.

9. The method of claim 8, wherein the physical token includes a transmitter configured to transmit the token identifier to the token validator, and wherein the transmitter is an active transmitter or a passive transmitter.

10. The method of claim 8, wherein the token dispenser includes a payment system for accepting a payment from a customer for the selected fare type, and a physical-token creator configured to create the physical token.

11. The method of claim 8, wherein the set of restrictions identifies at least one of:
   whether a travel route can include a transfer;
   a maximum distance of the travel route;
   an allowed direction of the travel route;
   a transit station where the physical token can be used; and
   a time at which the physical token can be used.

12. The method of claim 8, wherein the dispenser context data further includes a dispense time and the validator context includes a validation time, and wherein the determination of whether the physical token is valid includes determining a rate of travel between the dispense location and the validation location based on the dispense time and the validation time, and comparing the rate of travel to a threshold value.

13. The method of claim 8, wherein the validator context includes a validation time and wherein the determination of whether the physical token is valid includes determining a time duration between the validation time and a time at which the physical token was previously validated by the token validator or a different token validator, and determining whether the determined time duration exceeds a threshold time duration.

14. The method of claim 8, wherein the physical token is further encoded with an expiration time and/or the fare type, and wherein the token validator, when the server is unavailable or otherwise unreachable, is configured to validate the physical token based on the expiration time and the fare type.

15. A non-transitory computer-readable storage medium storing instructions that when executed by a computer cause the computer to perform a method for facilitating use of physical tokens, the method comprising:
   generating a token identifier;

generating, using a private key associated with the server, a cryptographic signature that is generated based on the token identifier;

transmitting the token identifier and the cryptographic signature to a token dispenser, wherein:
  the token dispenser is configured, upon having a payment processed that is for the value of transit to be associated with the token, to physically dispense a physical token, and
  the physical token is encoded with the token identifier and the cryptographic signature;

receiving, from the token dispenser, (i) a first indication that the physical token is dispensed, (ii) selection of a fare type, and (iii) dispenser context data including a dispense location;

associating the token identifier with the selected fare type and the dispenser context data;

receiving, from the token validator, a second indication that a dispensed physical token is being validated, wherein the second indication:
  (i) is transmitted after the token validator verifies the cryptographic signature encoded in the physical token using a public key associated with the server, and
  (ii) includes the token identifier encoded in the physical token and validator context data including a validation location;

identifying the fare type associated with the token identifier;

determining whether the physical token is valid based on (i) a set of restrictions associated with the fare type, (ii) the validator context data associated with the token identifier encoded in the physical token, and (iii) the dispenser context data received from the token validator; and transmitting a communication to the ticket validator indicating whether the physical token is valid, wherein the ticket validator, in response to receiving the communication, outputs an indicator whether the physical token is valid.

16. The method of claim 15, wherein the physical token includes a transmitter configured to transmit the token identifier to the token validator, and wherein the transmitter is an active transmitter or a passive transmitter.

17. The method of claim 15, wherein the set of restrictions identifies at least one of:
  whether a travel route can include a transfer;
  a maximum distance of the travel route;
  an allowed direction of the travel route;
  a transit station where the physical token can be used; and
  a time at which the physical token can be used.

18. The method of claim 15, wherein the dispenser context data further includes a dispense time and the validator context includes a validation time, and wherein the determination of whether the physical token is valid includes determining a rate of travel between the dispense location and the validation location based on the dispense time and the validation time, and comparing the rate of travel to a threshold value.

19. The method of claim 15, wherein the validator context includes a validation time and wherein the determination of whether the physical token is valid includes determining a time duration between the validation time and a time at which the physical token was previously validated by the token validator or a different token validator, and determining whether the determined time duration exceeds a threshold time duration.

20. The method of claim 15, wherein the physical token is further encoded with an expiration time and/or the fare type, and wherein the token validator, when the server is unavailable or otherwise unreachable, is configured to validate the physical token based on the expiration time and the fare type.

21. The server of claim 1, wherein the token dispenser is further configured to:
  receive a selection from a user of the token dispenser, the selection indicating whether the user desires a digital token in addition to or instead of the physical token; and
  if the selection indicates that the user desires a digital token, program the user's mobile device to dynamically output the token identifier and the cryptographic signature.

22. The method of claim 8, wherein the token dispenser is further configured to:
  receive a selection from a user of the token dispenser, the selection indicating whether the user desires a digital token in addition to or instead of the physical token; and
  if the selection indicates that the user desires a digital token, program the user's mobile device to dynamically output the token identifier and the cryptographic signature.

23. The storage medium of claim 15, wherein the token dispenser is further configured to:
  receive a selection from a user of the token dispenser, the selection indicating whether the user desires a digital token in addition to or instead of the physical token; and
  if the selection indicates that the user desires a digital token, program the user's mobile device to dynamically output the token identifier and the cryptographic signature.

* * * * *